(12) United States Patent
Kimura et al.

(10) Patent No.: US 9,294,001 B2
(45) Date of Patent: Mar. 22, 2016

(54) POWER CONVERTER WITH DEAD-TIME CONTROL FUNCTION

(71) Applicants: DENSO CORPORATION, Kariya, Aichi-pref. (JP); NIPPON SOKEN, INC., Nishio, Aichi-pref. (JP)

(72) Inventors: Norihito Kimura, Hekinan (JP); Kimikazu Nakamura, Handa (JP); Yuji Hayashi, Kasugai (JP); Kenji Tomita, Aichi-ken (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/178,662

(22) Filed: Feb. 12, 2014

(65) Prior Publication Data

US 2014/0226369 A1 Aug. 14, 2014

(30) Foreign Application Priority Data

Feb. 13, 2013 (JP) ................................. 2013-025713
Jan. 13, 2014 (JP) ................................. 2014-003823

(51) Int. Cl.
*H02M 3/337* (2006.01)
*H02M 1/38* (2007.01)
*H02M 1/00* (2007.01)

(52) U.S. Cl.
CPC .............. *H02M 3/3376* (2013.01); *H02M 1/38* (2013.01); *H02M 2001/0022* (2013.01); *H02M 2001/0054* (2013.01)

(58) Field of Classification Search
CPC ............. H02M 2001/0006; H02M 2001/0009; H02M 1/38; H02M 2001/0022; H02M 2001/0054; H02M 3/3376
USPC ............ 363/21.04, 21.05, 21.06, 21.09, 21.1; 327/261, 277
See application file for complete search history.

(56) References Cited

U.S. PATENT DOCUMENTS

| 8,278,854 B2* | 10/2012 | Imura ................. B60L 11/1803 318/400.02 |
| 8,385,092 B1* | 2/2013 | Shekhawat ............. H02M 1/38 363/132 |
| 2007/0139973 A1* | 6/2007 | Leung ............................ 363/16 |
| 2009/0146630 A1 | 6/2009 | Naka |
| 2012/0032657 A1* | 2/2012 | Dequina ........................ 323/271 |

(Continued)

FOREIGN PATENT DOCUMENTS

| JP | 3706852 | 8/2005 |
| JP | 2009-141564 | 6/2009 |

*Primary Examiner* — Jue Zhang
*Assistant Examiner* — Lakaisha Jackson
(74) *Attorney, Agent, or Firm* — Nixon & Vanderhye P.C.

(57) ABSTRACT

In a power converter, a feedback controller feedback controls a manipulated variable based on a first electrical parameter depending on input power and a feedback controlled variable determined for output power. A dead-time determiner determines a value of the dead time as a function of a boundary condition variable depending on at least one of the input power and the output power. The boundary condition represents a reference for determining whether the power converter is operating in a continuous conduction mode or a discontinuous conduction mode. The continuous conduction mode is designed for a current to be continuously flowing through an inductor included in the power converter or a load as an inductor current. The discontinuous conduction mode is designed for the inductor current to be discontinuously flowing through the inductor.

17 Claims, 18 Drawing Sheets

(56) References Cited

U.S. PATENT DOCUMENTS

| | | | |
|---|---|---|---|
| 2014/0001839 A1* | 1/2014 | Kakimoto | H02P 27/06 307/9.1 |
| 2014/0078787 A1* | 3/2014 | Sonobe | H02M 3/335 363/21.02 |
| 2014/0167722 A1* | 6/2014 | Lee | H02M 1/38 323/282 |

* cited by examiner

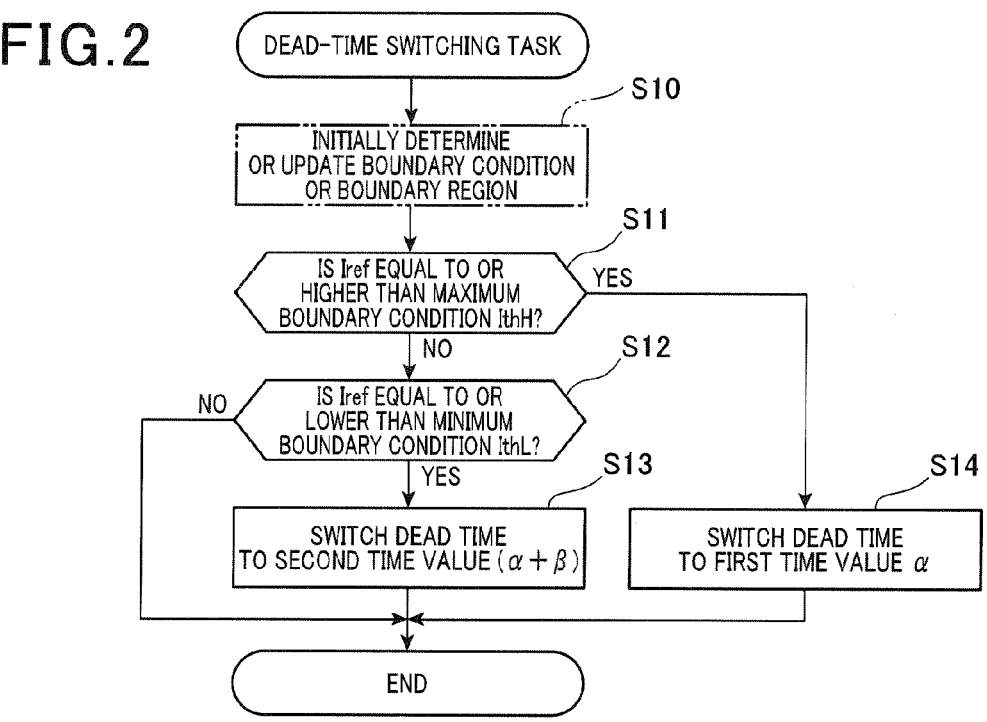
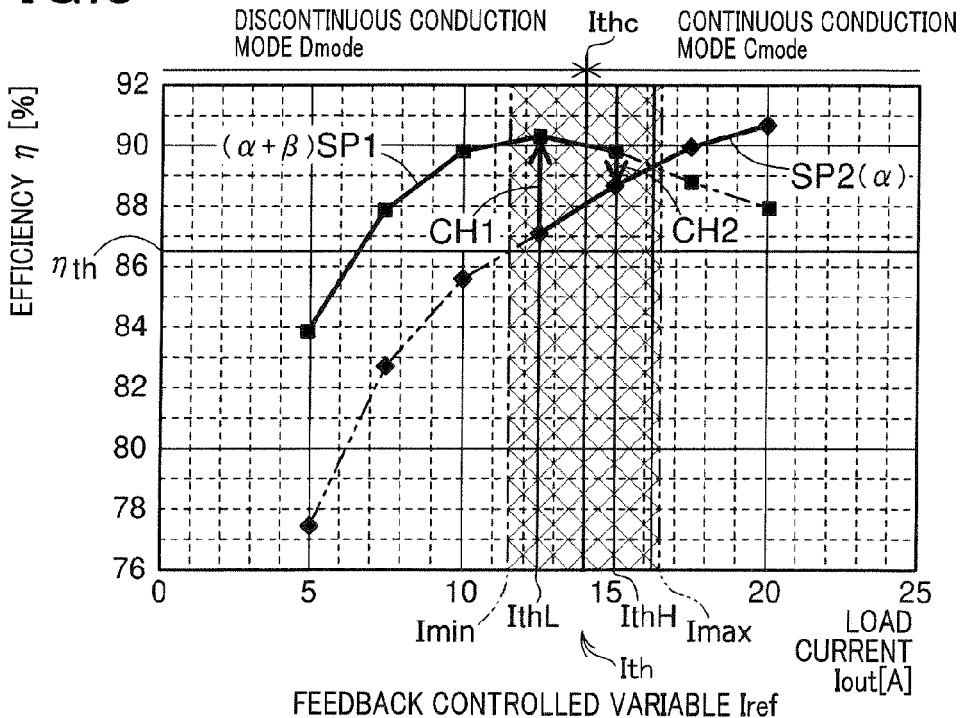

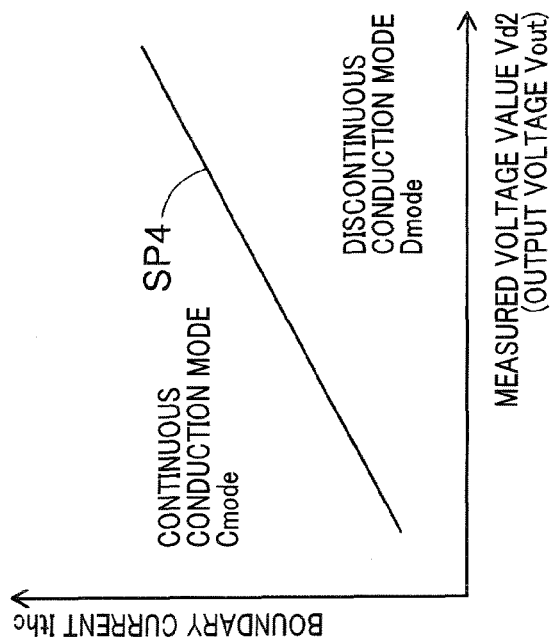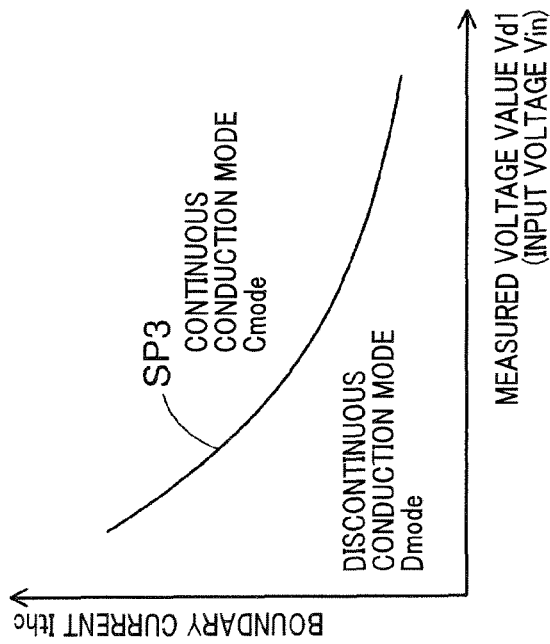

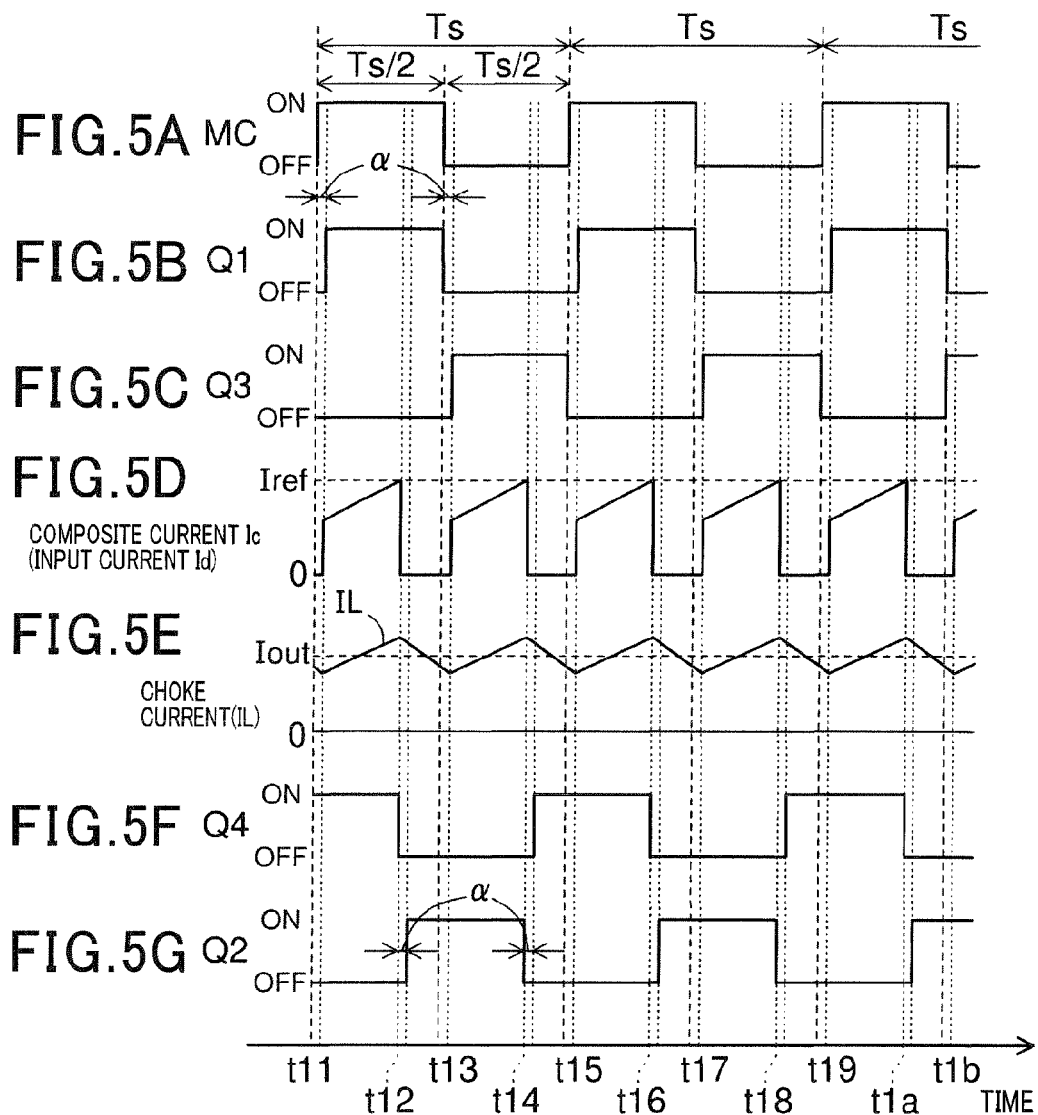

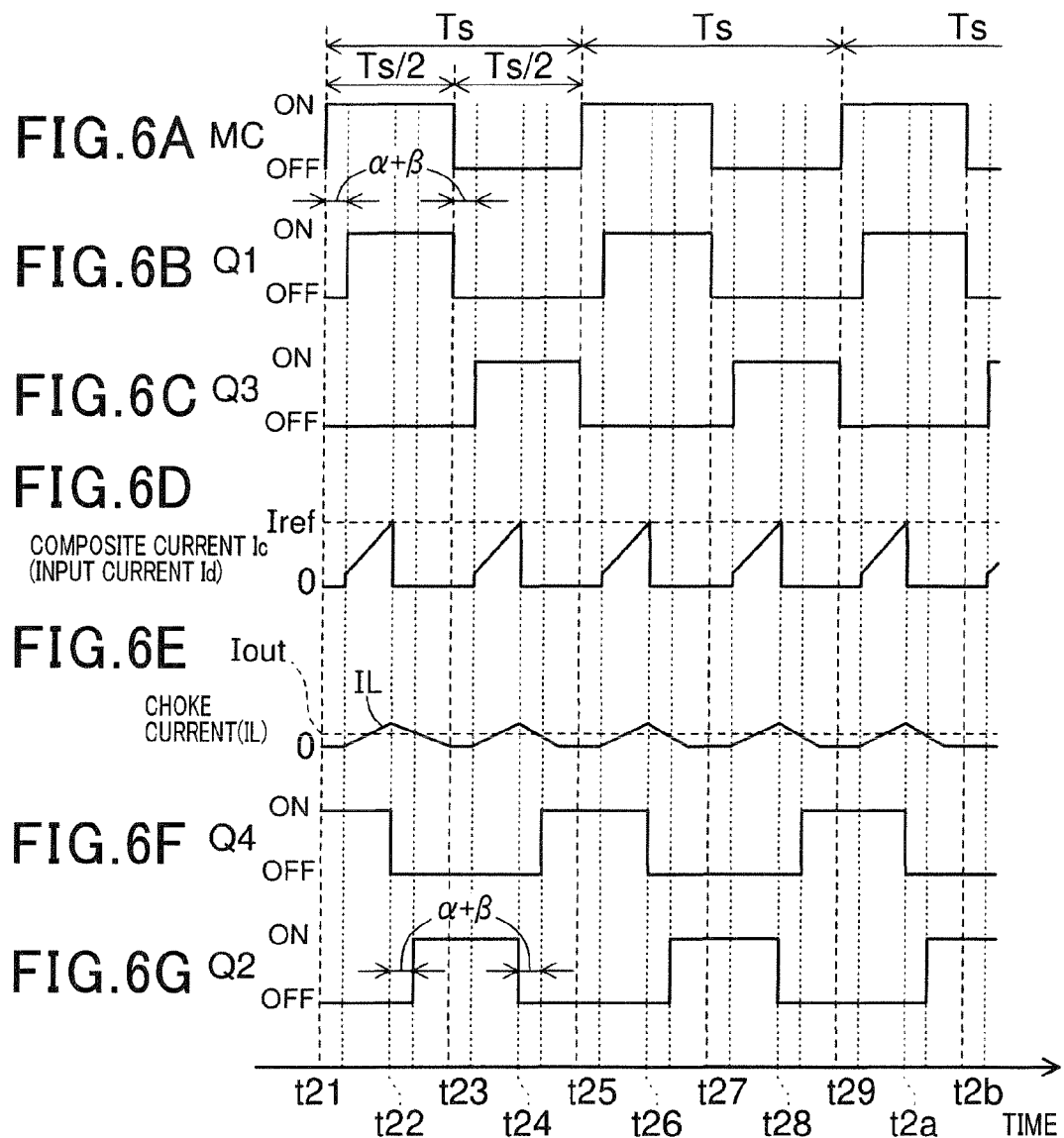

POWER CONVERTER WITH DEAD-TIME CONTROL FUNCTION

CROSS REFERENCE TO RELATED APPLICATIONS

This application is based on and claims the benefit of priority from Japanese Patent Applications 2013-025713 and 2014-003823 filed on Feb. 13, 2013 and Jan. 13, 2014, respectively the disclosure of each of which is incorporated in its entirety herein by reference.

TECHNICAL FIELD

The present disclosure relates to power converters having a dead-time control function.

BACKGROUND

Switching power supplies, as an example of power converters, are often used in electronic devices, electronic systems, and the like. Switching power converters normally include a switch circuit comprised of: upper-arm switching elements and lower-arm switching elements; and a transformer. The switching power converters are operative to alternately turn on a selected one of the upper-arm switching elements and a selected one of the lower-arm switching elements, thus converting direct-current (DC) power input from a DC power source into different power, such as alternating-current (AC) power. The switching power converters are also operative to step up or down the AC power input to the transformer by a turns ratio of the transformer while the step-up or step-down AC power is electrically isolated from the input AC power.

In these switching power supplies, there is a technology to prevent the series-connected upper- and lower-arm switching elements from being simultaneously turned on, thus prohibiting a high-level short-circuit current from flowing through the series-connected upper- and lower-arm switching elements. This technology is designed to turn off one of the high- and low-side switching elements, delay turn-on of the other thereof by a dead time from the turn-off timing, and turn on the other thereof after lapse of the dead time.

In contrast, introducing the dead time may have an influence on the power conversion efficiency of these switching power supplies. For this reason, it is important how the dead time should be determined in view of both the reliability and power conversion efficiency of the switching power supplies.

In view of this matter, there is a technology to determine a dead time between series-connected upper- and lower-arm switching elements, which is disclosed in Japanese Patent Publication No. 3706852.

A DC-DC converter as a switching power supply disclosed in the Patent Publication is further comprised of a resonant circuit in addition to the switch circuit set forth above. The resonant circuit performs resonating operations between an inductance connected in series to the primary winding of the transformer and each of the capacitance component of a selected one of the upper-arm switching elements and that of a corresponding lower-arm switching element connected in series.

The DC-DC converter measures a value of one of: an input current thereto, which is a primary current flowing through the primary winding of the transformer; an output current output therefrom; and a current having a magnitude proportional to the magnitude of the output current. Then, the DC-DC converter determines whether a measured value of the selected current becomes equal to or lower than a constant threshold current value, and increases a dead time between one of a selected one of the upper-arm switching elements and a corresponding lower-arm switching element connected in series thereto when the measured value becomes equal to or lower than the constant threshold current value. The increase in a dead time between a selected one of the upper-arm switching elements and a corresponding lower-arm switching element connected in series thereto permits the dead time to match with a period for which the resonant operations have been completed, or to be greater than the period. This aims to reduce turn-on loss of the DC-DC converter.

SUMMARY

The aforementioned technology disclosed in the Patent Publication merely changes a dead time between a selected one of the upper-arm switching elements and a corresponding lower-arm switching element connected in series thereto using the constant threshold current value for the input current to the DC-DC converter or the output current therefrom. In view of this point, let us assume that the DC-DC converter disclosed in the Patent Publication is applied to a motor vehicle. In this assumption, the DC-DC converter installed in a motor vehicle has a wide variable input-power range and a wide variable output-power range, i.e. a wide variable input-voltage range and a wide variable output-voltage range.

For this reason, it may be difficult for the aforementioned technology to properly increase the dead time at all operating points while a value of the input voltage widely varies; each of the operating points shows a pair of a value within the wide variable input-voltage range and a value within the wide-variable output-voltage range. It may be difficult to prevent short-circuit current at all the operating points, reducing the power conversion efficiency of the DC-DC converter; the power conversion efficiency represents the ratio of output power from the DC-DC converter to input power thereto. Particularly, during low-load operation of the DC-DC converter, it is more difficult to maintain, at a high level, the power conversion efficiency because the level of the output power is low.

In view of the circumstances set forth above, one aspect of the present disclosure seeks to provide power converters, which are capable of addressing the problem set forth above.

Specifically, an alternative aspect of the present disclosure aims to provide such power converters, which are capable of maintaining, at a high level, the power conversion efficiency even if the power converters have a variable wide input-power range or a variable wide output-power range.

According to a first exemplary aspect of the present disclosure, there is provided a power converter for outputting converted power to a load. The power converter includes a driver that alternately turns on upper- and lower-arm switching elements of a switch circuit with a dead time between on states of the upper- and lower-arm switching elements using a manipulated variable for the upper- and lower-arm switching elements to convert input power to the switch circuit into output power of the switch circuit. The upper- and lower-arm switching elements are connected in series to each other. The power converter includes a feedback controller that feedback controls the manipulated variable based on a first electrical parameter depending on the input power and a feedback controlled variable determined for the output power. The power converter includes a dead-time determiner that determines a value of the dead time as a function of a boundary condition varying depending on at least one of the input power and the output power. The boundary condition represents a reference for determining whether the power converter is operating in a continuous conduction mode or a discontinuous conduction mode. The continuous conduction mode is designed for a current to be continuously flowing through an inductor included in at least one of the power converter and the load as an inductor current. The discontinuous conduction mode is designed for the inductor current to be discontinuously flowing through the inductor.

According to a second exemplary aspect of the present disclosure, there is provided a power converter for outputting converted power to a load. The power converter includes a driver that alternately turns on upper- and lower-arm switching elements of a switch circuit with a dead time between on states of the upper- and lower-arm switching elements using a manipulated variable for the upper- and lower-arm switching elements to convert input power to the switch circuit into output power of the switch circuit. The upper- and lower-arm switching elements are connected in series to each other. The power converter includes a feedback controller that feedback controls the manipulated variable based on a first electrical parameter depending on the input power and a feedback controlled variable determined for the output power. The power converter includes a dead-time determiner that: obtains a value of a control parameter correlating with a power conversion efficiency of the power converter based on at least one of the first electrical parameter and a value of a second electrical parameter depending on the output power; and determines a value of the dead time such that the obtained value of the control parameter corresponding to the determined value of the dead time is maximized while the power converter is operating in a discontinuous conduction mode, the discontinuous conduction mode being designed for a current to be discontinuously flowing, as an inductor current, through an inductor included in at least one of the power converter and the load.

With the power converter according to the first exemplary aspect, the dead-time determiner determines a value of the dead time as a function of the boundary condition varying depending on at least one of the input power and the output power. Thus, even if the power converter has a variable wide input-power range and a variable wide output-power range, the threshold condition follows the variation in the input power or the output power. This properly determines a value of the dead time, which is capable of preventing the occurrence of a short-circuit current through the upper- and lower-arm switching elements at all operating points; each of the operating points shows a pair of a value within the wide variable input-voltage range and a value within the wide-variable output-voltage range. This maintains, at a high level, the power conversion efficiency of the power converter, especially during low-load operation.

With the power converter according to the second exemplary aspect, the dead-time determiner obtains a value of the control parameter correlating with the power conversion efficiency of the power converter based on at least one of the first electrical parameter and the value of the second electrical parameter depending on the output power. Then, the dead-time determiner determines a value of the dead time such that the obtained value of the control parameter corresponding to the determined value of the dead time is maximized while the power converter is operating in the discontinuous conduction mode. Thus, it is possible to maximize the power conversion efficiency while the power converter is operating in the discontinuous conversion mode.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 2 is a flowchart schematically illustrating an example of specific operations of a dead-time switching task carried out by a feedback unit illustrated in FIG. 1;

FIG. 3 is a graph schematically illustrating a boundary condition determined by the feedback unit illustrated in FIG. 1;

FIG. 4A is a graph schematically illustrating a characteristic curve showing an example of correlation between a variable of a reference boundary current and a variable of an input voltage according to the first embodiment;

FIG. 4B is a graph schematically illustrating a characteristic curve showing an example of correlation between a variable of a reference boundary current and a variable of an output voltage according to the first embodiment;

FIGS. 5A to 5G is a timing chart jointly illustrating how a feedback unit, a signal comparator, a pulse generator, and a driver drive switching elements in a continuous mode according to the first embodiment;

FIGS. 6A to 6G is a timing chart jointly illustrating how the feedback unit, the signal comparator, the pulse generator, and the driver drive the switching elements in a discontinuous conduction mode according to the first embodiment;

DETAILED DESCRIPTION OF EMBODIMENT

Embodiments of the present disclosure will be described hereinafter with reference to the accompanying drawings. In the embodiments, the phrase "A is/are connected to B" or the similar expressions represents that A is/are electrically connected to B unless otherwise is described.

First Embodiment

Figure 1:
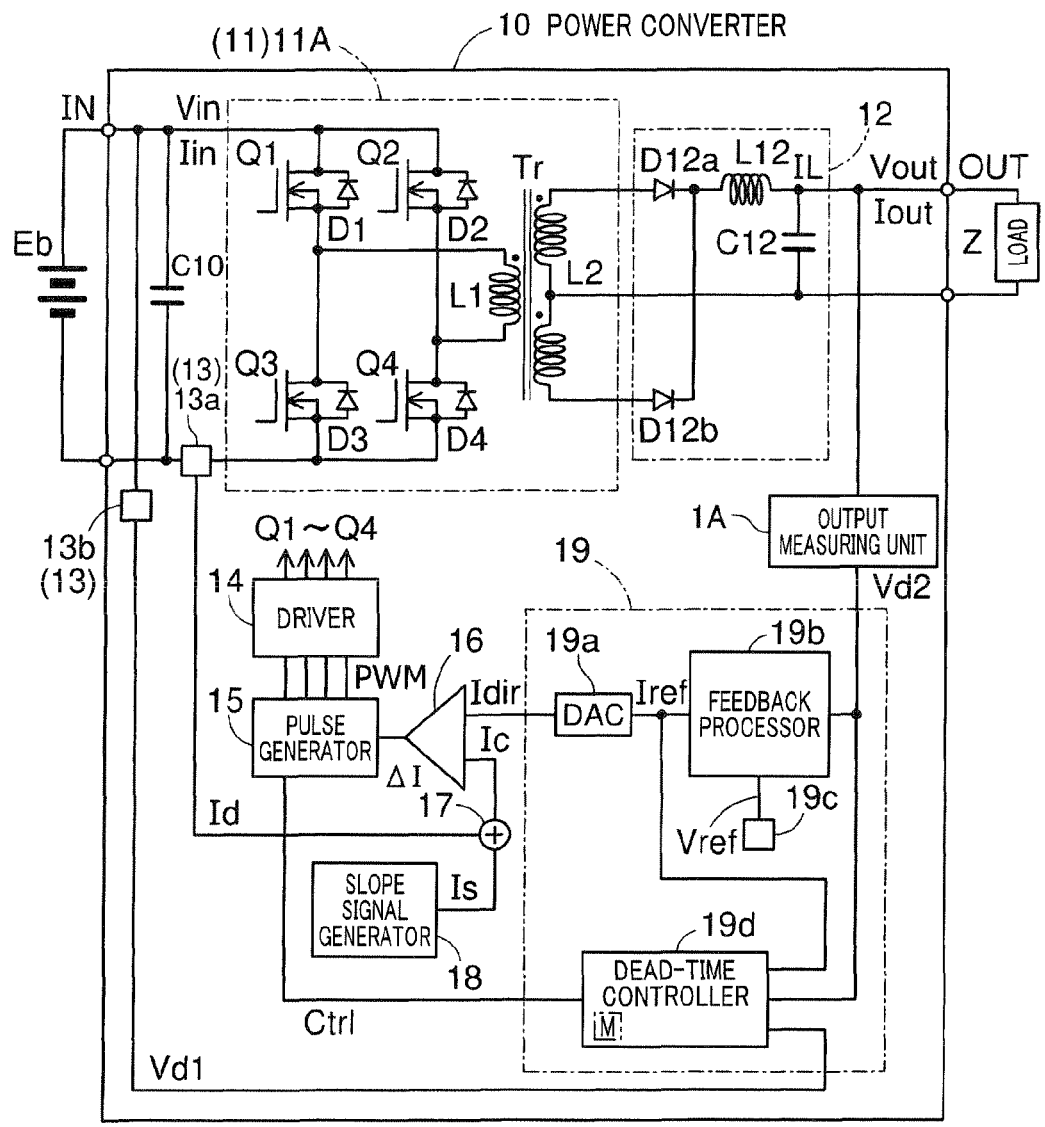
FIG. 1 is a circuit diagram schematically illustrating an example of the overall configuration of a power converter according to a first embodiment of the present disclosure.

Referring to FIG. 1, there is illustrated a power converter 10, in other words, a switching power supply, according to a first embodiment of the present disclosure; the switching power supply is an example of power converters according to the present disclosure.

The power converter 10 serves as a DC-DC converter operative to convert a variable input DC voltage Vin of, for example, 288 V, as an example of input power, into a required output voltage of, for example, 14 V, as an example of output power. That is, the power converter 10 has a wide dynamic range of voltage conversion.

The power converter 10 has input terminals, i.e. positive and negative input terminals, IN to which a DC power source Eb is connected, and has output terminals, i.e. positive and negative output terminals, OUT to which a load Z is connected. As the DC power source Eb, a battery, such as a secondary battery, a fuel cell, or the like, can be used. As the load Z, a DC battery having a predetermined capacity different from that of the DC power source Eb can be used. As the load Z, a rotary machine, such as an electric power generator, a power generator, a motor, or the like, a head lamp, or the like can also be used.

The power converter 10 includes a capacitor C10, a switch circuit 11A, a rectifying and smoothing circuit 12, an output measuring unit 1A. The power converter 10 also includes a driver 14, a pulse generator 15, a signal comparator 16, a signal processor 17, a slope-signal generator 18, a feedback unit 19, a first measuring unit 13a, and a second measuring unit 13b. These elements of the power converter 10 will be described hereinafter. Note that each element of the power converter 10 is designed to process, unless otherwise is described, at least one of various signals, which are communicated in the power converter 10, in a predetermined form, such as an analog form or a digital form, that the element can handle. These various signals include, as described later, a measured current value Id and measured voltage values Vd1 and Vd2.

The capacitor C10 has a first end connected to the positive input terminal IN, and a second end, which is opposite to the first end, connected to the negative input terminal IN. That is, the capacitor C10 is connected in parallel to the DC power source Eb, and is operative to smooth the input voltage Vin input thereto from the DC power source Eb.

The switch circuit 11A is comprised of series-connected switching elements Q1 and Q3, series-connected switching elements Q2 and Q4, diodes D1 to D4, and a transformer Tr. For example, as the switching elements Q1 to Q4, IGBTs or power MOSFETs can be respectively used.

Each of the switching elements Q1 to Q4 has a first terminal, a second terminal, and a conductive path formed therebetween. The first terminal of the switching element Q1 is connected to the positive input terminal IN via a positive DC input line. The second terminal of the switching element Q1 is connected to the first terminal of the switching element Q3 to constitute the series-connected switching elements Q1 and Q3. The second terminal of the switching element Q3 is connected to the negative input terminal IN via a negative DC input line.

Similarly, the first terminal of the switching element Q2 is connected to the positive input terminal IN via the positive DC input line. The second terminal of the switching element Q2 is connected to the first terminal of the switching element Q4 to constitute the series-connected switching elements Q2 and Q4. The second terminal of the switching element Q4 is connected to the negative input terminal IN via the negative DC input line. For example, if power MOSFETs are used as the switching elements Q1 to Q4, the drain of each of the switching elements Q1 to Q4 serves as the first terminal, and the source serves as the second terminal.

With the configuration, the switching elements Q1 and Q2 will also be referred to as high-side switching elements or upper-arm switching elements, and the switching elements Q3 and Q4 will also be referred to as low-side switching elements or lower-arm switching elements.

Each of the diodes D1 to D4 is connected between the first end and second end of a corresponding one of the switching elements Q1 to Q4 in antiparallel thereto, and serves as a free-wheel diode.

If power MOSFETs are used as the switching elements Q1 to Q4, intrinsic diodes of the power MOSFETs can be used as the free-wheel diodes, thus eliminating the free-wheel diodes.

The series-connected switching elements Q1 and Q3 and the series-connected switching elements Q2 and Q4 are parallelly connected to each other in full-bridge configuration.

Each of the switching elements Q1 to Q4 has a control terminal connected to the driver 14. If power MOSFETs are used as the switching elements Q1 to Q4, the gate of each of the switching elements Q1 to Q4 serves as the control terminal thereof. As described later, a drive signal sent from the driver 14 and input to the control terminal of each of the switching elements Q1 to Q4 opens or closes the conductive path thereof, that is, turns on or off the corresponding switching element.

In the first embodiment, the driver 14 is designed to complementarily turn on the high- and low-side switching elements Q1 and Q3. Similarly, the driver 14 is designed to complementarily turn on the high- and low-side switching elements Q2 and Q4. In addition, the driver 14 is designed to alternately drive the first set of high- and low-side switching elements Q1 and Q3 and the second set of high- and low-side switching elements Q2 and Q4. These operations of the driver 14 permit the switching circuit 11A to serve as an inverter that converts DC power, that is, the DC voltage Vin, input to the switching circuit 11A from the DC power source Eb into AC power, that is, an AC voltage, and applies the AC power to the transformer Tr.

The transformer Tr is comprised of a primary winding L1 and a secondary winding L2 with a center tap. The rectifying and smoothing circuit 12 is comprised of a first diode D12a, a second diode 12b, a capacitor C12, and a coil L12. A connecting point between the second end of the switching element Q1 and the first end of the switching element Q3 is connected to a first end of the primary winding L1. A connecting point between the second end of the switching element Q2 and the first end of the switching element Q4 is connected to a second end of the primary winding L1.

The secondary winding L2 also has a first end and a second end opposite thereto. The first end of the secondary winding L2 is connected to the anode of the first diode 12a, and the second end thereof is connected to the anode of the second diode 12b. The center tap of the secondary winding L2 is connected to the negative output terminal OUT. The center tap divides the secondary winding L2 into a first winding portion and a second winding portion. The turns ratio representing the number of turns of each of the first and second winding portions of the secondary winding L2 to the number of turns of the primary winding L1 is set to a predetermined value.

The transformer Tr is operative to convert the AC voltage applied to the primary winding L1 into a different AC voltage induced in the secondary winding L2 while the primary winding L1 is electrically isolated from the secondary winding L2; the magnitude of the AC voltage induced across the secondary winding L2 is determined based on the turns ratio.

The cathode of the first diode 12a and the cathode of the second diode 12b are commonly connected to one end of the coil L12. The other end of the coil L12 is connected to the positive output terminal OUT. The capacitor C12 is connected between the coil L12 and the load Z to be in parallel to the load Z.

Specifically, the first and second diodes 12a and 12b constitute a full-wave rectifier that full-wave rectifies the AC voltage induced across the secondary winding L2, thus generating a DC voltage. The coil L12 and the capacitor C12 constitute an LC filter that smooth the DC voltage output from the full-wave rectifier, thus generating an output voltage Vout across the positive and negative output terminals OUT to be supplied to the load Z.

The other end of the coil L12, which is connected to the positive output terminal OUT of the power converter 10, is also connected to the output measuring unit 1A.

The output measuring unit 1A is operative to measure a value Vd2 of the output voltage Vout in an analog format. The value Vd2 of the output voltage Vout is changed depending on the conditions of the load Z and the like. The output measuring unit 1A is also operative to output the measured value Vd2 of the output voltage Vout to the feedback unit 19.

The first measuring unit 13a is provided in the negative DC input line, and is connected between the second end of the capacitor C10 and the second end of the switching element Q3. The first measuring unit 13a is operative to measure a value, i.e. an absolute value, Id of current input from the DC power source Eb to the switch circuit 11A in the analog format; this current will be referred to as an input current. In the first embodiment, control of switching of the switching elements Q1 to Q4 permits the measured input-current value Id to vary positively and negatively in a given wave form.

The second measuring unit 13b is provided in a line connected between the positive DC input line and the feedback unit 19. The second measuring unit 13b is operative to measure a value Vd1 of the input voltage Vin in the analog format. In the first embodiment, control of switching of the switching elements Q1 to Q4 permits the measured input-voltage value Vd1 to vary positively and negatively in a given wave form.

The pulse generator 15 is connected to the signal comparator 16 and to the driver 14. The pulse generator 15 is operative to generate, based on a current deviation ΔI supplied from the signal comparator 16 described later, PWM signals for the respective switching elements Q1 to Q4. For example, the pulse generator 15 is operative to generate the PWM signals for the respective switching elements Q1 to Q4 such that the current deviation ΔI becomes zero.

Each of the PWM signals for a corresponding one of the switching elements Q1 to Q4 consists of a train of pulses having a predetermined duty, i.e. a duty factor, for each switching cycle as a manipulated variable. The duty factor represents a controllable on-pulse width for each predetermined switching cycle, in other words, a predetermined ratio, i.e. percentage, of on duration to the total duration of each switching cycle.

In the first embodiment, the pulse generator 15 is operative to cyclically generate a PWM signal for the upper-arm switching element Q1 and a PWM signal for the lower-arm switching element Q3 with a dead time therebetween using, for example, the current deviation ΔI and a master clock MC having a predetermined pulse cycle Ts. The pulse generator 15 is operative to cyclically generate a PWM signal for the upper-arm switching element Q2 and a PWM signal for the lower-arm switching element Q4 with a dead time therebetween using, for example, the current deviation ΔI. In the first embodiment, the dead time used for alternately turning on the switching elements Q1 and Q3 and that used for alternately turning on the switching elements Q2 and Q4 are set to be equal to each other.

The driver 14 is operative to amplify the PWM signals for the respective switching elements Q1 to Q4, and outputs the amplified PWM signals to the control terminals of the respective switching elements Q1 to Q4, thus individually driving, i.e. turning on or off, the switching elements Q1 to Q4.

The slope-signal generator 18 is connected to the signal processor 17 and is operative to generate a slope signal Is for gradually increasing or decreasing the measured input-current value Id. In the first embodiment, the slope signal has a configuration that periodically increases or decreases with a predetermined slope like a saw-tooth wave. As illustrated in FIG. 5 described later, an input current flowing through the primary winding L1 based on the drive of the switching elements Q1 to Q4 increases with time due to the characteristic of the primary winding L1. For example, the slope signal Is serves to compensate the slope of the input current to a suitable slope. The slope-signal generator 18 is also operative to output the slope signal Is to the signal processor 16.

The signal processor 17 is connected to the first measuring module 13a. The signal processor 17 is operative to calculate the sum of the slope signal Is and the measured input-current value Id to generate a value of composite current signal Ic, thus outputting the value of the composite current signal Ic to the signal comparator 16.

The signal comparator 16 has first and second input terminals and an output terminal. The first input terminal is connected to the feedback unit 19, the second terminal is connected to the signal processor 17, and the output terminal is connected to the pulse generator 15. The signal comparator 16 is operative to compare a value of the composite current signal Ic with a command current value Idir sent from the feedback unit 19 as a reference value, thus calculating the current deviation ΔI between the value of the composite current signal Ic and the command current value Idir. The signal comparator 16 is also operative to supply the current deviation ΔI to the pulse generator 15.

The feedback unit 19 is for example comprised of a digital-analog converter (DAC) 19a, a feedback processor 19c, a target-value setter 19c, and a dead-time control unit 19d. Note that the feedback unit 19 can be configured as a programmed logic unit, such as a computer, a hard-wired logic unit, or the combination of hardwired-logic and programmed-logic hybrid units. That is, the functional blocks of the feedback unit 19 can be designed as hardware modules, software modules, or the combinations of hardware and software modules.

The feedback unit 19 is operative to perform feedback control of the output voltage Vout of the power converter 10 relative to a reference voltage Vref for each switching cycle.

Note that the feedback unit 19 is configured to usually carry out processes of signals supplied thereto in a digital format when the signals are in analog format. However, the feedback unit 19 can be configured to carry out signal processing on signals supplied thereto in analog format.

The reference-value setter 19c is operative to set a value of the reference voltage Vref. The reference-voltage setter 19c can be operative to store a value of the reference voltage Vref in a storage medium. The reference-voltage setter 19c can be operative to set a value of the reverence voltage Vref to be a value required for the load Z. The reference-voltage setter 19c can be operative to set the reverence voltage value Vref based on signals and/or data supplied from an external unit, such as an external ECU or an external computer.

For each predetermined switching cycle, the feedback processor 19b is operative to perform:

calculation of a difference Δ between the measured value Vd2 of the output voltage Vout and the reference voltage value Vref; and calculation of a feedback controlled variable Iref for the input current using the sum of a proportional gain term and an integral gain term of a PI feedback control algorithm (PI algorithm) using the difference Δ as its input.

In the PI algorithm, the feedback controlled variable is expressed based on the proportional gain term and the integral gain term.

The proportional gain term for the feedback controlled variable contributes to change in the feedback controlled variable in proportion to the difference Δ. The integral gain term is proportional to an accumulated offset of instantaneous values of the difference Δ over time to reset the accumulated offset (steady-state deviation) over time to zero. Note that the feedback processor 19b can calculate a feedback controlled variable Iref using the sum of a proportional gain term, an integral gain term, and a derivative gain term of a known PID feedback control algorithm (PID algorithm) using the difference Δ as its input. The derivative term is proportional to a difference between a previous value of the difference Δ and a present value thereof to improve response of the feedback controlled variable to suppress fluctuations in the difference Δ.

To the dead-time control unit 19d, the value Vd1 of the input voltage Vin is input. The dead-time control unit 19d is also connected to the feedback processor 19b and the pulse generator 15d. Based on the value Vd1 of the input voltage Vin and a value of the feedback controlled variable Iref, the dead-time control unit 19d is operative to output a dead-time control signal Ctrl to the pulse generator 15d for controlling the dead time used by the pulse generator 15d. Operations of the dead-time control unit 19d based on the value Vd1 of the input voltage Vin will be described in detail later.

The DAC 19a is operative to convert a value of the feedback controlled variable Iref output from the feedback processor 19b into a command current value Idir in the analog format, and output the command current value Idir in the analog format to the signal comparator 16.

Thus, as described above, the signal comparator 16 is operative to compare the value of the composite current signal Ic with the command current value Idir sent from the feedback unit 19, thus calculating the current deviation ΔI between the value of the composite current signal Ic and the command current value Idir. The signal comparator 16 is also operative to supply the current deviation ΔI to the pulse generator 15.

The pulse generator 15 is operative to:

cyclically generate, based on the current deviation ΔI supplied from the signal comparator 16 and the master clock MC, a PWM signal for the upper-arm switching element Q1 and a PWM signal for the lower-arm switching element Q3 with a dead time therebetween; and cyclically generate, based on the current deviation ΔI supplied from the signal comparator 16, a PWM signal for the upper-arm switching element Q2 and a PWM signal for the lower-arm switching element Q4 with a dead time therebetween.

Particularly, the pulse generator 15 is operative to switch the dead time used for turn-on of the pair of switching elements Q1 and Q3 and for turn-on of the pair of switching elements Q2 and Q4 between a first time value and a second time value based on the dead-time control signal Ctrl supplied from the dead-time control unit 19d.

The PWM signals are sent to the respective switching elements Q1 to Q4 via the driver 14, so that the switching elements Q1 to Q4 are individually driven to reduce the current deviation ΔI, that is, to adjust the value Vd2 of the output voltage Vout to be equal to the reference voltage value Vref. That is, the driver 14 and the pulse generator 15 serve as, for example a driver according to the present disclosure.

As described above, the power converter 10 uses a voltage feedback loop including the output measuring unit 1A, the feedback unit 19, the signal comparator 16, and so on, and a current feedback loop including the first measuring unit 13a, the signal processor 17, and so on. Thus, the power converter 10 is configured as a current-mode control DC-DC converter. That is, the voltage feedback loop and the current feedback loop serve as, for example a feedback controller according to the present disclosure.

Next, operations of the power converter 10, which are associated with operations of the dead-time control unit 19d, which serves as a dead-time determiner, for controlling the dead time will be described in detail with reference to FIGS. 2 to 6.

FIG. 2 schematically illustrates specific operations of a dead-time switching task carried out by the feedback unit 19 as a function of the dead-time control unit 19d. The feedback unit 19 periodically performs the dead-time switching task while the power converter 10 is operating.

In the dead-time switching task illustrated in FIG. 2, the dead-time control unit 19d initially determines or updates a boundary condition Ith for the feedback controlled variable Iref in step S10; the boundary condition Ith is required to switch the dead time between the first time value and the second time value.

Specifically, the boundary condition Ith determines whether the power converter 10 is operating in a continuous conduction mode Cmode or a discontinuous conduction mode Dmode. The continuous conduction mode Cmode is designed for a current IL to be continuously flowing through the coil L12, and, in the discontinuous conduction mode Dmode, the current IL is designed not to be continuously flowing through the coil L12. The current IL will be referred to as a choke current IL. In other words, when the power converter 10 is operating in the continuous conduction mode Cmode in a given period, the choke current IL is not zero [Amperes] in the period. In contrast, when the power converter 10 is operating in the discontinuous conduction mode Dmode in a given period, the choke current IL is zero in the period.

A single reference boundary current Ithc, which theoretically separates the continuous conduction mode Cmode in which the choke current IL is not zero and the discontinuous conduction mode Dmode in which the choke current IL is zero can be set as the boundary condition Ith. In the first embodiment, a hysteresis width defined from a minimum boundary current IthL lower than the reference boundary current Ithc to a maximum boundary current IthH higher than the reference boundary current Ithc is set as the boundary condition Ith.

In addition to or in place of the single boundary current or hysteresis width, a predetermined boundary region for a load current, i.e. an output current, Tout output from the power converter 10 and flowing through the load Z can be used as the boundary condition Ith for switching the dead time between the first time value and the second time value.

As illustrated by cross-hatching in FIG. 3, the boundary region is previously defined from a lower limit Imin for the load current Tout to an upper limit Imax higher than the lower limit Imin therefor. The boundary region is designed to include therein the boundary width from the minimum boundary current IthL to the maximum boundary current IthH.

Specifically, in step S10, the dead-time control unit 19d initially determines or updates the boundary condition Ith as a function of, for example, at least one of the measured current value Id, the measured input-voltage value Vd1, and the measured output-voltage value Vd2. The dead-time control unit 19d can initially determine or updates the boundary condition Ith as a function of the power conversion efficiency TI; the power conversion efficiency η represents the ratio of output power Pout from the power converter 10 to input power Pin thereto. The power conversion efficiency η can be calculated by the dead-time control unit 19d based on, for example, the measured current value Id, the measured input-voltage value Vd1, the measured output-voltage value Vd2, and the load current Tout that can be measured by the output measuring unit 1A. The dead-time control unit 19d can initially determine or updates the boundary condition Ith based on signals and/or data supplied from an external unit, such as an external ECU or an external computer.

In the first embodiment, the boundary condition Ith includes the minimum boundary current IthL and the maximum boundary current IthH. Hereinafter, the dead time used by the pulse generator 15 set forth above will be referred to as a dead time DT.

Following the operation in step S10, the dead-time control unit 19d determines whether the value of the feedback controlled variable Iref calculated by the feedback processor 19b is equal to or higher than the maximum boundary current IthH in step S11. Upon determination that the value of the feedback controlled variable Iref is equal to or higher than the maximum boundary current IthH (YES in step S11), the dead-time control unit 19d instructs the pulse generator 15 to switch the dead time DT used by the pulse generator 15 to the first time value, referred to as a, in step S14.

Specifically, in step S14, the dead-time control unit 19d transfers the dead-time control signal Ctrl indicative of the first time value $\alpha$ to the pulse generator 15. The first time value $\alpha$ includes a period inevitably required for a corresponding pair of switching elements to operate.

Otherwise, upon determination that the value of the feedback controlled variable Iref is lower than the maximum boundary current IthH (NO in step S11), the dead-time control unit 19d determines whether the value of the feedback controlled variable Iref calculated by the feedback processor 19b is equal to or lower than the minimum boundary current IthL in step S12. Upon determination that the value of the feedback controlled variable Iref is equal to or lower than the minimum boundary current IthL (YES in step S12), the dead-time control unit 19d instructs the pulse generator 15 to switch the dead time DT used by the pulse generator 15 to the second time value, referred to as $(\alpha+\beta)$, in step S13. The second time value $(\alpha+\beta)$ is set to be greater than the first time value $\alpha$ by a value $\beta$.

Specifically, in step S13, the dead-time control unit 19d transfers the dead-time control signal Ctrl indicative of the second time value $(\alpha+\beta)$ to the pulse generator 15. The second time value $(\alpha+\beta)$ includes a period inevitably required for a corresponding pair of switching elements to operate.

On the other hand, upon determination that the value of the feedback controlled variable Iref is lower than the maximum boundary current IthH (NO in step S11), and that the value of the feedback controlled variable Iref is higher than the minimum boundary current IthL (NO in step S12), the dead-time control unit 19d maintains the dead time DT to the value determined in step S13 or step S14 of the previous execution period of the dead-time switching task, and terminates the dead-time switching task. This feature, which is deviated from a dead zone defined within the hysteresis width defined from the minimum boundary current IthL to the maximum boundary current IthH, makes it possible to prevent the dead time DT from being frequently switched between the first time value $\alpha$ and the second time value $(\alpha+\beta)$.

FIG. 3 is a graph schematically illustrating characteristic curves SP1 SP2 respectively showing first and second examples of correlation between the load current Tout flowing through the load Z and the power conversion efficiency η of the power converter 10 according to the first embodiment. The characteristic curve SP1 shows how the first example of correlation between the load current Tout flowing through the load Z and the power conversion efficiency η of the power converter 10 varies when the first to fourth switching elements Q1 to Q4 are driven by the driver 14 using the second time value (α+β) as the dead time DT. The characteristic curve SP2 shows how the second example of correlation between the load current Tout flowing through the load Z and the power conversion efficiency η of the power converter 10 varies when the first to fourth switching elements Q1 to Q4 are driven by the driver 14 using the first time value α as the dead time DT.

When a value of the load current Tout exceeds the reference boundary current Ithc within the observer's right-side area in the graph with respect to the reference boundary current Ithc, the power converter 10 is operating in the continuous mode Cmode. Otherwise, a value of the load current Tout does not exceed the reference boundary current Ithc within the observer's left-side area in the graph with respect to the reference boundary current Ithc, the power converter 10 is operating in the discontinuous mode Dmode. An example of the boundary region defined from the lower limit Imin for the load current Tout to the upper limit Imax therefor is illustrated by cross-hatching in FIG. 3. Specifically, the boundary region contains the reference boundary current Ithc, the minimum boundary current IthL, and the maximum boundary current IthH.

When the switching elements Q1 to Q4 are driven using the second time value (α+β) as the dead time DT on the characteristic curve SP1 in FIG. 3, if the value of the feedback controlled variable Iref gets to be equal to or higher than the maximum boundary current IthH, the switching elements Q1 to Q4 are switched to be driven using the first time value α as the dead time DT on the characteristic curve SP2 in FIG. 3 (see arrow CH2 and steps S10 and S14). In addition, when the switching elements Q1 to Q4 are driven using the first time value α as the dead time DT on the characteristic curve SP2 in FIG. 3, if the value of the feedback controlled variable Iref gets to be equal to or lower than the minimum boundary current IthL, the switching elements Q1 to Q4 are switched to be driven using the second time value (α+β) as the dead time DT on the characteristic curve SP1 in FIG. 3 (see arrow CH1 and steps S12 and S13).

FIG. 3 demonstrates that, when the power converter 10 is operating in the continuous mode Cmode, a value of the power conversion efficiency η based on the characteristic curve SP2 at a given value of the load current Iout is higher than a corresponding value of the power conversion efficiency η based on the characteristic curve SP1 at the same value of the load current Tout. That is, when the power converter 10 is operating in the continuous mode Cmode, using the first time value α as the dead time DT lower than the second time value (α+β) permits the power conversion efficiency η to be higher than that obtained using the second time value (α+β) as the dead time DT.

However, FIG. 3 demonstrates that, when the power converter 10 is operating in the discontinuous mode Dmode, a value of the power conversion efficiency η based on the characteristic curve SP1 at a given value of the load current Tout is higher than a corresponding value of the power conversion efficiency η based on the characteristic curve SP2 at the same value of the load current Tout. That is, using the second time value (α+β) higher than the first time value α as the dead time DT permits the power conversion efficiency η to be higher than that obtained using the first time value α as the dead time DT.

Note that, in FIG. 3, reference character ηth represents a predetermined threshold value of the power conversion efficiency η of the power converter 10. Switching the dead time DT between the first time value α and the second time value (α+β) is preferably carried out when the power conversion efficiency η of the power converter 10 is equal to or higher than the threshold value ηth.

FIG. 4A is a graph schematically illustrating a characteristic curve SP3 showing an example of correlation between a variable of the reference boundary current Ithc and a variable of the input voltage Vin according to the first embodiment. In the graph of FIG. 4A, when the combination of the actual measured voltage value Vd1 of the input voltage Vin and an actual value of the reference boundary current Ithc is higher than the characteristic curve SP3, it is determined that the power converter 10 is operating in the continuous mode Cmode. In contrast, when the combination of an actual measured voltage value Vd1 of the input voltage Vin and an actual value of the reference boundary current Ithc is lower than the characteristic curve SP3, it is determined that the power converter 10 is operating in the discontinuous mode Dmode.

FIG. 4B is a graph schematically illustrating a characteristic curve SP4 showing an example of correlation between a variable of the reference boundary current Ithc and a variable of the output voltage Vout according to the first embodiment. In the graph of FIG. 4B, when the combination of an actual measured voltage value Vd2 of the output voltage Vout and an actual value of the reference boundary current Ithc is higher than the characteristic curve SP4, it is determined that the power converter 10 is operating in the continuous mode Cmode. In contrast, when the combination of an actual measured voltage value Vd2 of the output voltage Vout and an actual value of the reference boundary current Ithc is lower than the characteristic curve SP4, it is determined that the power converter 10 is operating in the discontinuous mode Dmode.

Specifically, the boundary condition Ith including the reference boundary current Ithc, the minimum boundary current IthL, and the maximum boundary current IthH varies depending on actual measured values Vd1 and Vd2 of the input and output voltages Vin and Vout and the characteristic curves SP3 and SP4.

In the first embodiment, the dead-time control unit 19d stores therein maps M in data-table format, in mathematical expression format, and/or program format. The maps M include: information showing the characteristic curve SP3, and information indicative of the characteristic curve SP4; these characteristic curves SP3 and SP4 are previously determined. Thus, the dead-time control unit 19d initially determines or updates the boundary condition Ith based on, for example, the measured input-voltage value Vd1, the measured output-voltage value Vd2, and the maps M. As described above, the dead-time control unit 19d can initially determine or update the boundary condition Ith based on signals and/or data supplied from an external unit, such as an external ECU or an external computer. The dead-time control unit 19d can initially determine or update the boundary condition Ith based on the specifications of the switch circuit 11A and/or those of the load Z.

For example, if the maps M include information indicative of the characteristic curve SP1 as a function of the power conversion efficiency η and the load current Tout, and information indicative of the characteristic curve SP2 as a function of the power conversion efficiency η and the load current Tout, the dead-time control unit 19d determines the boundary condition Ith based on the maps M and the power conversion efficiency η. Then, the dead-time control unit 19d switches the dead time DT between the first time value α and the second time value (α+β) based on the boundary condition Ith.

FIGS. 5A to 5G jointly illustrate how the feedback unit 19, the signal comparator 16, the pulse generator 15, and the driver 14 drive the switching elements Q1 to Q4 in the continuous conduction mode Cmode. FIGS. 6A to 6G jointly illustrate how the feedback unit 19, the signal comparator 16, the pulse generator 15, and the driver 14 drive the switching elements Q1 to Q4 in the discontinuous conduction mode Dmode. Each of FIGS. 5A and 6A schematically illustrates how the master clock MC varies over time, each of FIGS. 5B and 6B schematically illustrates how the switching element Q1 is driven over time, and each of FIGS. 5C and 6C schematically illustrates how the switching element Q3 is driven over time. Each of FIGS. 5D and 6D schematically illustrates how the composite current signal Ic corresponding to the input current Iin varies over time, and each of FIGS. 5E and 6E schematically illustrates how the choke current IL varies over time. Each of FIGS. 5F and 6F schematically illustrates how the switching element Q4 is driven over time, and each of FIGS. 5G and 6G schematically illustrates how the switching element Q4 is driven over time.

Note that, as described above, reference character Ts represents the pulse cycle of the master clock MC, that is, a time interval between the rising timing of one pulse of the master clock MC and that of the next pulse of the master clock MC. Half of the pulse cycle Ts is represented by Ts/2. An on state of each pulse of the maser clock MC and each of the switching elements Q1 to Q4 is represented by ON, and an off state of each pulse of the maser clock MC and each of the switching elements Q1 to Q4 is represented by OFF.

Referring to FIG. 5, when the first time value α has elapsed since each time a pulse of the master clock MC rises at time t11, t15, t19, . . . , the driver 14 supplies the PWM signal to the switching element Q1 to turn on the switching element Q1 while the switching element Q4 is on based on the current deviation ΔI between the measured input-current value Id and the command current value Idir corresponding to the feedback controlled variable Iref. This increases the input current Iin flowing through the set of switching elements Q1 and Q4 and the primary winding L1 to reduce the current deviation ΔI, thus approaching the input current Iin to the value of the feedback controlled variable Iref based on the reference voltage Vref. Each time a pulse of the master clock MC falls at time t13, t17, t1b, . . . , the driver 14 stops the supply of the PWM signal to the switching element Q1 to turn off the switching element Q1.

When the first time value α has elapsed since each time a pulse of the master clock MC falls at time t13, t17, t1b, . . . , the driver 14 supplies the PWM signal to the switching element Q3 to turn on the switching element Q3 while the switching element Q2 is on based on the current deviation ΔI between the measured input-current value Id and the command current value Idir corresponding to the feedback controlled variable Iref. This increases the input current Iin flowing through the set of switching elements Q2 and Q3 and the primary winding L1 to reduce the current deviation ΔI, thus approaching the input current Iin flowing through the set of switching elements Q2 and Q3 and the primary winding L1 to the value of the feedback controlled variable Iref based on the reference voltage Vref. Each time a pulse of the master clock MC falls at time t15, t19, . . . , the driver 14 stops the supply of the PWM signal to the switching element Q3 to turn off the switching element Q3.

As illustrated in FIG. 5D, the input current Iin rises each time the switching element Q1 is turned on, and the switching element Q3 is turned on, and thereafter, the input current Iin gradually increases based on the feedback control of the feedback unit 19. Each time the input current Iin reaches the value of the feedback controlled variable Iref, the input current Iin falls down to zero because of turn-off of the switching element Q4. As illustrated in FIG. 5E, the choke current IL is a continuous current, which is designed to be continuously higher than zero.

In contrast, the driver 14 controls on/off of the switching elements Q2 and Q4 based on each time the measured input-current value Id reaches the value of the feedback controlled variable Iref.

Specifically, each time the measured input-current value Id reaches the value of the feedback controlled variable Iref at time t12, t16, t1a, . . . , the driver 14 stops output of the PWM signal to the switching element Q4 to turn off the switching element Q4, thus zeroing the input current Iin. Similarly, each time the measured input-current value Id reaches the value of the feedback controlled variable Iref at time t14, t18, . . . , the driver 14 stops output of the PWM signal to the switching element Q2 to turn off the switching element Q2, thus zeroing the input current Iin.

When the first time value α has elapsed since each time the switching element Q2 is turned off at time t14, t18, . . . , the driver 14 supplies the PWM signal to the switching element Q4 to turn on the switching element Q4 while the switching element Q1 is on based on the current deviation ΔI between the measured input-current value Id and the command current value Idir corresponding to the feedback controlled variable Iref. This reduces the current deviation ΔI, thus approaching the input current Iin flowing through the set of switching elements Q1 and Q4.

Similarly, when the first time value α has elapsed since each time the switching element Q4 is turned off at time t12, t16, t1a, . . . , the driver 14 supplies the PWM signal to the switching element Q2 to turn on the switching element Q2 while the switching element Q3 is on based on the current deviation ΔI between the measured input-current value Id and the command current value Idir corresponding to the feedback controlled variable Iref.

Referring to FIG. 6, when the second time value (α+β) has elapsed since each time a pulse of the master clock MC rises at time t21, t25, t29, . . . , the driver 14 supplies the PWM signal to the switching element Q1 to turn on the switching element Q1 while the switching element Q4 is on based on the current deviation ΔI between the measured input-current value Id and the command current value Idir corresponding to the feedback controlled variable Iref. This increases the input current Iin flowing through the set of switching elements Q1 and Q4 and the primary winding L1 to reduce the current deviation ΔI, thus approaching the input current Iin to the value of the feedback controlled variable Iref based on the reference voltage Vref. Each time a pulse of the master clock MC falls at time t23, t27, t2b, . . . , the driver 14 stops the supply of the PWM signal to the switching element Q1 to turn off the switching element Q1.

When the second time value (α+β) has elapsed since each time a pulse of the master clock MC falls at time t23, t27, t2b, . . . , the driver 14 supplies the PWM signal to the switching element Q3 to turn on the switching element Q3 while the switching element Q2 is on based on the current deviation ΔI between the measured input-current value Id and the command current value Idir corresponding to the feedback controlled variable Iref. This increases the input current Iin flowing through the set of switching elements Q2 and Q3 and the primary winding L1 to reduce the current deviation ΔI, thus approaching the input current Iin flowing through the set of switching elements Q2 and Q3 and the primary winding L1 to the value of the feedback controlled variable Iref based on the reference voltage Vref. Each time a pulse of the master clock MC falls at time t25, t29, . . . , the driver 14 stops the supply of the PWM signal to the switching element Q3 to turn off the switching element Q3.

As illustrated in FIG. 6D, the input current Iin rises each time the switching element Q1 is turned on, and the switching element Q3 is turned on, and thereafter, the input current Iin gradually increases based on the feedback control of the feedback unit 19. Each time the input current Iin reaches the value of the feedback controlled variable Iref, the input current Iin falls down to zero because of turn-off of the switching element Q4. As illustrated in FIG. 6E, the choke current IL is a discontinuous current, which is sometimes zero.

In contrast, the driver 14 controls on/off of the switching elements Q2 and Q4 based on each time the measured input-current value Id reaches the value of the feedback controlled variable Iref.

Specifically, each time the measured input-current value Id reaches the value of the feedback controlled variable Iref at time t22, t26, t2a, . . . , the driver 14 stops output of the PWM signal to the switching element Q4 to turn off the switching element Q4, thus zeroing the input current Iin. Similarly, each time the measured input-current value Id reaches the value of the feedback controlled variable Iref at time t24, t28, . . . , the driver 14 stops output of the PWM signal to the switching element Q2 to turn off the switching element Q2, thus zeroing the input current Iin.

When the second time value (α+β) has elapsed since each time the switching element Q2 is turned off at time t24, t28, . . . , the driver 14 supplies the PWM signal to the switching element Q4 to turn on the switching element Q4 while the switching element Q1 is on based on the current deviation ΔI between the measured input-current value Id and the command current value Idir corresponding to the feedback controlled variable Iref. This reduces the current deviation ΔI, thus approaching the input current Iin flowing through the set of switching elements Q1 and Q4.

Similarly, when second time value (α+β) has elapsed since each time the switching element Q4 is turned off at time t22, t26, t2a, . . . , the driver 14 supplies the PWM signal to the switching element Q2 to turn on the switching element Q2 while the switching element Q3 is on based on the current deviation ΔI between the measured input-current value Id and the command current value Idir corresponding to the feedback controlled variable Iref.

As described above, the power converter 10 according to the first embodiment is comprised of the dead-time control unit 19d. The dead-time control unit 19d determines a value of the dead time DT, required between turn-on of an upper-arm switching element and a corresponding lower-arm switching element connected in series thereto, as a function of the boundary condition Ith that defines the boundary at which an operating mode of the power converter 10 is changed between the continuous conduction mode Cmode and the discontinuous conduction mode Dmode (see FIG. 1). The boundary condition Ith varies depending on at least one of input power and output power of the power converter 10.

This determines a value of the dead time DT to be suitable for the continuous conduction mode Cmode or for the discontinuous conduction mode Dmode based on the boundary condition Ith even if the power converter 10 has a wide variable input-power range and a wide variable output-power range. This makes it possible to prevent short-circuit current from flowing through the series-connected upper- and lower-arm switching elements even if the input voltage Vin and/or the output voltage Vout widely vary. This maintains at a high level the power conversion efficiency η of the power converter 10 over its total operating range including a low-load operation range.

The dead-time control unit 19d is also configured to determine a value of the dead time DT based on the variable boundary condition Ith and the feedback controlled variable Iref calculated by the feedback processor 19b. This configuration can perform the determination of the dead time DT using the feedback controlled variable Iref without using another element for transferring another current value to the dead-time control unit 19d. This results in a reduction of the manufacturing cost of the power converter 10.

The dead-time control unit 19d is configured to determine a value of the dead time DT as a function of the variable boundary condition Ith that varies depending on the variation in the input voltage Vin to the power converter 10 and that in the output voltage Vout therefrom (see FIG. 1). This configuration reliably and immediately determines a value of the dead time DT to be suitable for the continuous conduction mode Cmode or for the discontinuous conduction mode Dmode even if input and output conditions for the power converter 10 vary, thus reliably maintaining at a high level the power conversion efficiency η during the total operating range including a low-load operation range.

Specifically, the dead-time control unit 19d is configured to variably determine the variable boundary condition as a function of:

a first measured value of a first electrical parameter depending on input power to, for example, the primary winding L1 of the primary winding L1 of the switch circuit 11A, such as the measured voltage value Vd1; and a second measured value of a second electrical parameter depending on output power from, for example, the secondary winding L2 of the secondary winding L2 of the switch circuit 11A, such as the measured voltage value Vd2.

Thus, even if input and output conditions for the power converter 10 vary, it is possible to reliably maintain at a high level the power conversion efficiency η during the total operating range including a low-load operation range.

The dead-time control unit 19d is configured to store therein the maps M including information indicative of the characteristic curve SP3, and information indicative of the characteristic curve SP4. The characteristic curve SP3 shows an example of correlation between a variable of the reference boundary current Ithc and a variable of the input voltage Vin. The characteristic curve SP4 shows an example of correlation between a variable of the reference boundary current Ithc and a variable of the output voltage Vout. This configuration reliably and immediately determines a value of the dead time DT to be suitable for the continuous conduction mode Cmode or for the discontinuous conduction mode Dmode even if a value of the input voltage Vin widely varies, so that a corresponding value of the output voltage Vout widely varies.

The dead-time control unit 19d is configured to determine, as the variable boundary condition Ith, the hysteresis width defined from the minimum boundary current IthL to the maximum boundary current IthH for the feedback controlled variable Iref (see FIG. 3). This configuration makes it possible to prevent the occurrence of hunting that means the situation in which the dead time DT is frequently switched between the first time value α for the continuous conduction mode Cmode and the second time value (α+β) for the discontinuous conduction mode Dmode. Note that, in the first embodiment, the variable boundary condition Ith includes two conditions of the minimum boundary current IthL and the maximum boundary current IthH as the hysteresis, but can include three or more conditions. The variable boundary condition Ith can be variable depending on the specifications of the switch circuit 11A and/or the load Z.

The dead-time control unit 19d is configured to determine a value of the dead time DT within the variable boundary region used as the variable boundary condition Ith (see FIG. 3); the variable boundary region is defined from the lower limit Imin for the load current Tout to the upper limit Imax, which includes the variable boundary condition Ith. This configuration increases the flexibility to change a value of the dead time DT as compared with the aforementioned configuration using the variable boundary condition Ith, thus further improving the power conversion efficiency η of the power converter 10 over its total operating range including a low-load operation range. The dead-time control unit 19d is configured to determine the boundary condition Ith as a function of the power conversion efficiency η of the power converter 10 (see FIG. 3). This reliably prevents the occurrence of short-circuit current in the switch circuit 11A.

The first measuring unit 13a can be located within a predetermined range between the primary winding L1 and a corresponding pair of series-connected switching elements as long as it can accurately measure the primary current. This modification more accurately measure the input current Iin flowing through the primary current as the measured input-current values Id. This results in more improvement of the power conversion efficiency η over the total operating range including a low-load operation range.

Second Embodiment

Figure 7:
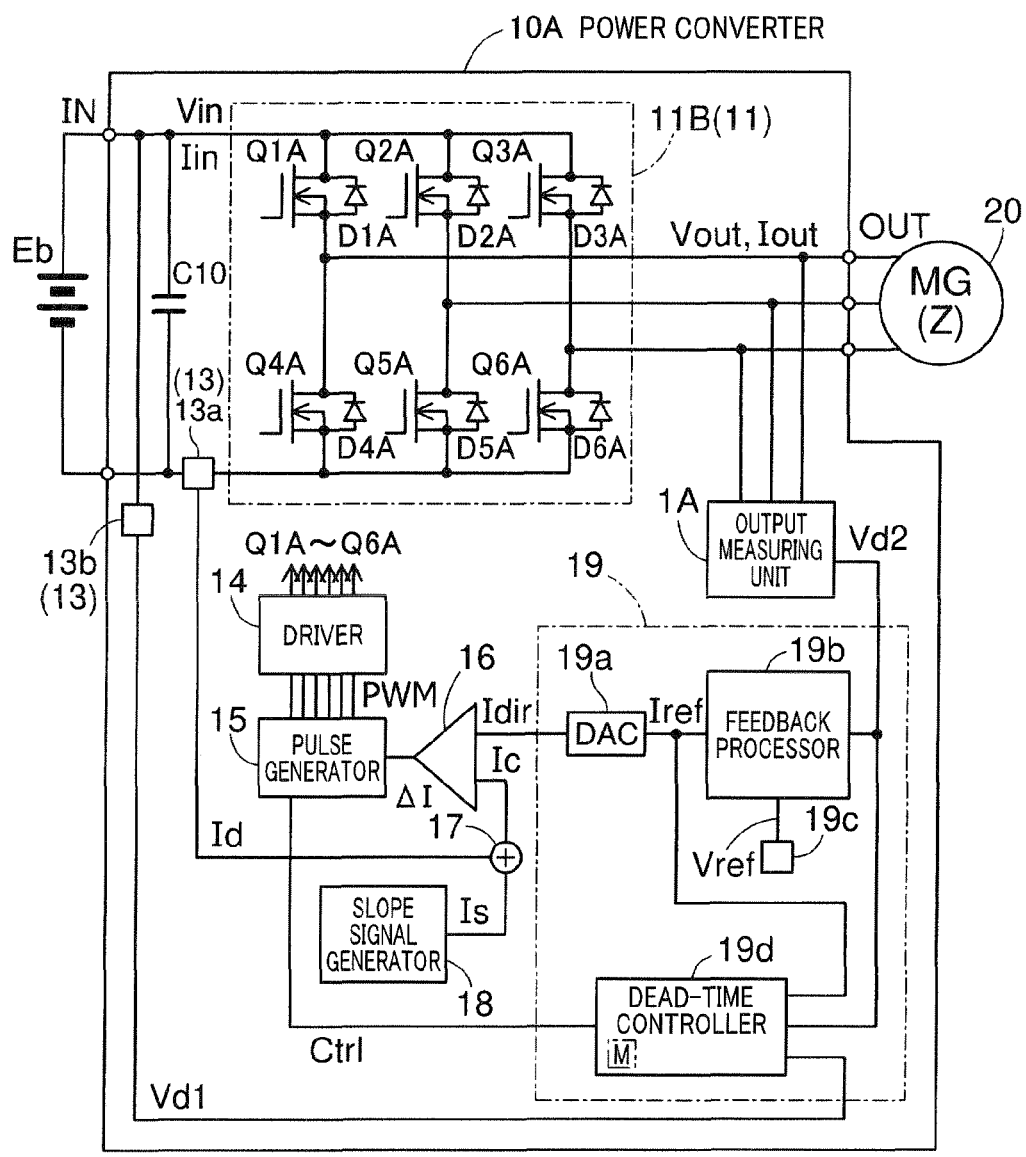
FIG. 7 is a circuit diagram schematically illustrating an example of the overall configuration of a power converter according to a second embodiment of the present disclosure.

A power converter 10A according to a second embodiment of the present disclosure will be described hereinafter with reference to FIG. 7.

The structure and/or functions of the power converter 10A according to the second embodiment are different from those of the power converter 10 according to the first embodiment by the following points. So, the different points will be mainly described hereinafter, and therefore, redundant descriptions of like parts between the first and second embodiments, to which like reference characters are assigned, are omitted or simplified.

The power converter 10A according to the second embodiment is comprised of a switch circuit 11B in place of the switch circuit 11A according to the first embodiment. The switch circuit 11B is operative to output a three-phase AC voltage as an example of periodic voltage signals whose at least one of voltage and frequency varies with time. The three-phase AC voltage is supplied to a three-phase rotary electric machine 20, such as a motor-generator (MG), as an example of inductive loads in place of the load Z. That is, the power converter 10A serves as a three-phase inverter.

For example, the three-phase rotary electric machine 20 is provided with: an armature comprised of an inductive core and three-phase armature windings wound therearound; and a field member comprised of, for example, one or more magnets. When the armature is energized to generate a magnetic field, the generated magnetic field of the armature and a magnetic field generated by the field member cooperatively rotate any one of the armature and the field member relative to the other thereof to thereby create torque.

The power converter 10A has first, second, and third-phase output terminals OUT, such as, U-, V-, and W-phase output terminals OUT connected, via cables, to the respective three-phase armature windings, that is, U-, V-, and W-phase armature windings, of the three-phase rotary electric machine 20.

The switch circuit 11B is comprised of a first pair of series-connected switching elements Q1A and Q4A, a second pair of series-connected switching elements Q2A and Q5A, a third pair of series-connected switching elements Q3A and Q6A, and diodes D1A to D6A. For example, as the switching elements Q1A to Q6A, IGBTs or power MOSFETs can be respectively used.

Each of the switching elements Q1A to Q6A has a first terminal, a second terminal, and a conductive path formed therebetween. The first terminal of the switching element Q1A is connected to the positive input terminal IN via the positive DC input line. The second terminal of the switching element Q1A is connected to the first terminal of the switching element Q4A to constitute the series-connected switching elements Q1A and Q4A. The second terminal of the switching element Q4A is connected to the negative input terminal IN via the negative DC input line.

Similarly, the first terminal of the switching element Q2A is connected to the positive input terminal IN via the positive DC input line. The second terminal of the switching element Q2A is connected to the first terminal of the switching element Q5A to constitute the series-connected switching elements Q2A and Q5A. The second terminal of the switching element Q5A is connected to the negative input terminal IN via the negative DC input line.

In addition, the first terminal of the switching element Q3A is connected to the positive input terminal IN via the positive DC input line. The second terminal of the switching element Q3A is connected to the first terminal of the switching element Q6A to constitute the series-connected switching elements Q3A and Q6A. The second terminal of the switching element Q6A is connected to the negative input terminal IN via the negative DC input line.

With the configuration, the switching elements Q1A to Q3A will also be referred to as high-side switching elements, and the switching elements Q4A to Q6A will also be referred to as low-side switching elements.

Each of the diodes D1A to D6A is connected between the first end and second end of a corresponding one of the switching elements Q1A to Q6A in antiparallel thereto, and serves as a free-wheel diode.

If power MOSFETs are used as the switching elements Q1A to Q6A, intrinsic diodes of the power MOSFETs can be used as the flee-wheel diodes, thus eliminating the free-wheel diodes.

The series-connected switching elements Q1A and Q4A, the series-connected switching elements Q2A and Q5A, and the series-connected switching elements Q3A and Q6A are parallelly connected to each other in bridge configuration.

Each of the switching elements Q1A to Q6A has a control terminal connected to the driver 14.

In the second embodiment, a connecting point between the series-connected switching elements Q1A and Q4A is connected to the first-phase output terminal OUT connected to the U-phase armature winding. A connecting point between the series-connected switching elements Q2A and Q5A is connected to the second-phase output terminal OUT connected to the V-phase armature winding. A connecting point between the series-connected switching elements Q3A and Q6A is connected to the third-phase output terminal OUT connected to the W-phase armature winding.

Because the output voltage Vout output from the switch circuit 11B is a three-phase AC voltage, the output measuring unit 1A is operative to measure an instantaneous value, an absolute value, a peak value, an effective value, or the like as a value Vd2 of the output voltage Vout for each phase in an analog format. The output measuring unit 1A is also operative to output the measured value Vd2 of the output voltage Vout for each phase to the feedback unit 19.

Specifically, the high- and low-side switching elements Q1A and Q4A correspond to the pair of switching elements Q1 and Q3 or the pair of switching elements Q2 and Q4. Similarly, the high- and low-side switching elements Q2A and Q5A correspond to the pair of switching elements Q1 and Q3 or the pair of switching elements Q2 and Q4. The high- and low-side switching elements Q3A and Q6A correspond to the pair of switching elements Q1 and Q3 or the pair of switching elements Q2 and Q4.

Other elements of the power converter 10B according to the second embodiment are substantially identical to those of the power converter 10 according to the first embodiment. Thus, one of the high-side switching elements Q1A to Q3A and a corresponding one of the low-side switching elements Q4A to Q6A are complementarily turned on with the dead time DT between the adjacent on durations while the dead time DT is switched between the first time value $\alpha$ and the second time value $(\alpha+\beta)$. This causes the switch circuit 11B to serve as an inverter.

As described above, the configuration of the power converter 10A according to the second embodiment is substantially identical to that of the power converter 10 according to the first embodiment except that the configurations of the switch circuit 11B and the load Z. The configuration therefore achieves the same effects as those achieved by the power converter 10 according to the first embodiment.

Third Embodiment

A power converter 10B according to a third embodiment of the present disclosure will be described hereinafter with reference to FIG. 8.

The structure and/or functions of the power converter 10B according to the third embodiment are different from those of the power converter 10 according to the first embodiment by the following points. So, the different points will be mainly described hereinafter, and therefore, redundant descriptions of like parts between the first and third embodiments, to which like reference characters are assigned, are omitted or simplified.

The power converter 10B according to the third embodiment is comprised of a first measuring unit 13c in place of the first measuring unit 13a. The first measuring unit 13c is located, for example, between the coil L12 and the output terminal OUT. The first measuring unit 13c is operative to measure a value of the choke current IL, i.e. an output current from the switch circuit 11A, Iout flowing through the coil L12. That is, the signal processor 17 is connected to the first measuring module 13c. The signal processor 17 is operative to calculate the sum of the slope signal Is and a measured value of the choke current IL as the measured input-current value Id to generate a value of composite current signal Ic, thus outputting the value of the composite current signal Ic to the signal comparator 16. As a modification of the DC-DC converter 10B, the DC-DC converter 10B can be comprised of both the first measuring units 13a and 13c and calculate the sum of the slope signal Is and the measured current value of the choke current IL or the measured input-current value Id to generate a value of composite current signal Ic.

Figure 8:
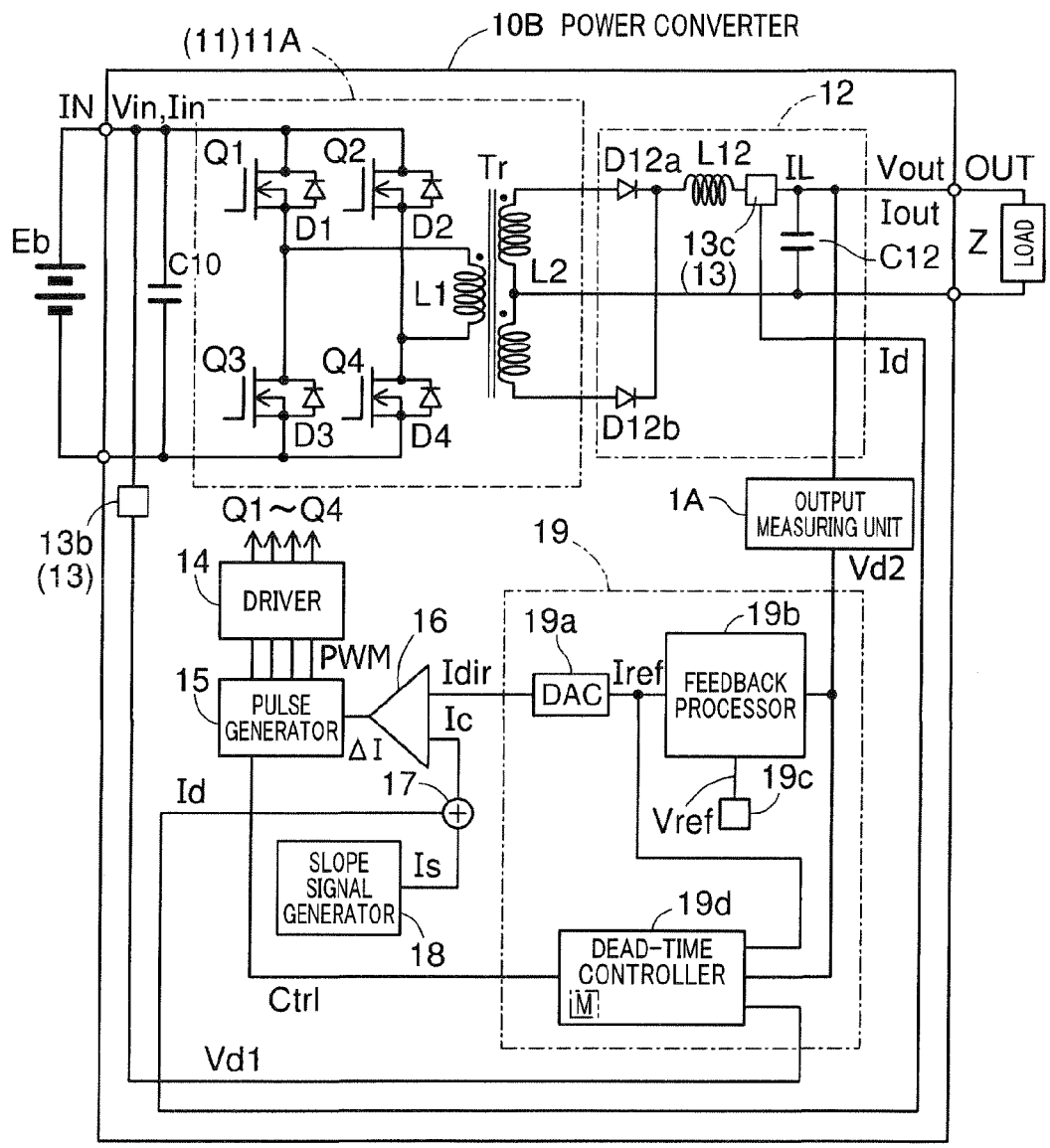
FIG. 8 is a circuit diagram schematically illustrating an example of the overall configuration of a power converter according to a third embodiment of the present disclosure.

As illustrated in FIG. 8, it is preferable that the first measuring unit 13c is located to be close to the coil L12 in order to accurately measure the choke current IL. That is, the first measuring unit 13c is preferably located within a predetermined range between the coil L12 and the output terminal OUT as long as it can accurately measure the choke current IL.

As described above, the configuration of the power converter 10B according to the third embodiment is substantially identical to that of the power converter 10 according to the first embodiment except that the output current from the switch circuit 11A is used in place or in addition to the input current Iin to the switch circuit 11A. The configuration therefore achieves the same effects as those achieved by the power converter 10 according to the first embodiment.

Fourth Embodiment

A power converter 10C according to a fourth embodiment of the present disclosure will be described hereinafter with reference to FIGS. 9 to 19.

The structure and/or functions of the power converter 10C according to the fourth embodiment are different from those of the power converter 10 according to the first embodiment by the following points. So, the different points will be mainly described hereinafter, and therefore, redundant descriptions of like parts between the first and fourth embodiments, to which like reference characters are assigned, are omitted or simplified.

The power converter 10C according to the fourth embodiment is provided with a dead-time control unit 19e in place of the dead-time control unit 19d. As described above, the dead-time control unit 19d is configured to switch the dead time DT used by the pulse generator 15 between the first time value $\alpha$ and the second time value $(\alpha+\beta)$ as a function of the boundary condition Ith between the continuous conduction mode Cmode and the discontinuous conduction mode Dmode.

In contrast, the dead-time control unit 19e, which serves as a dead-time determiner according to the fourth embodiment, is designed to optimally determine a value of the dead time DT such that the power conversion efficiency $\eta$ of the power converter 10C becomes its highest value. Thus, the power converter 10C according to the third embodiment can be designed to operate in both the continuous conduction mode Cmode and the discontinuous conduction mode Dmode, and in only the discontinuous conduction mode Dmode.

Figure 9:
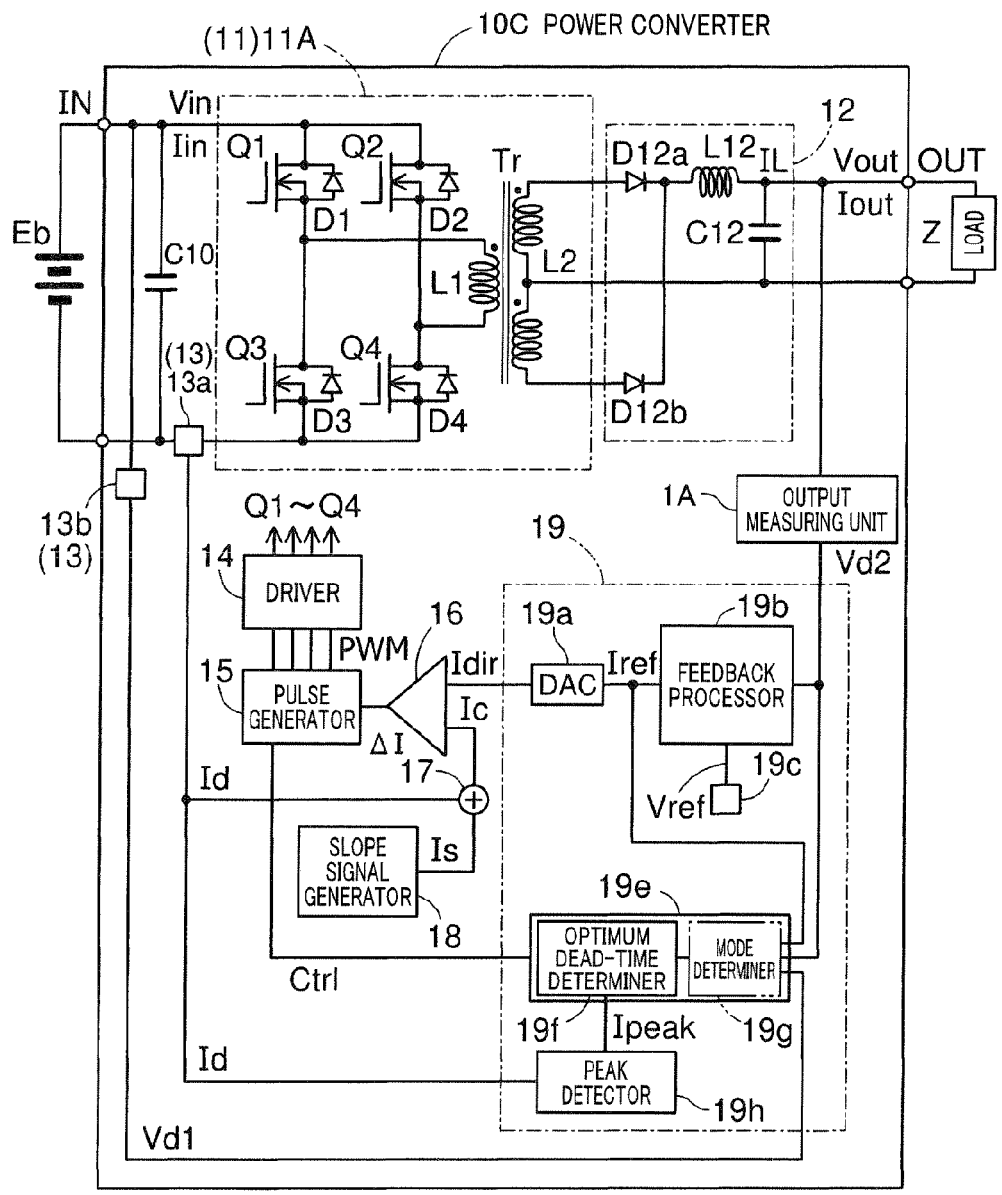
FIG. 9 is a circuit diagram schematically illustrating an example of the overall configuration of a power converter according to a fourth embodiment of the present disclosure.

Referring to FIG. 9, the dead-time control unit 19e is specially comprised of a mode determiner 19g and an optimum dead-time determiner 19f. As illustrated by two-dot chain line, the mode determiner 19g is operatively connected to the second measuring unit 13b and the output measuring unit 1A, and operative to determine whether the DC-DC converter 10C is operating in the discontinuous conduction mode Dmode based on the maps M and at least one of the measured input-voltage value Vd1 and the measured output-voltage value Vd2. If the DC-DC converter 10C is designed to operate in only the discontinuous conduction mode Dmode, the mode determiner 19g can be eliminated.

If the mode determiner 19g determines that the DC-DC converter 10C is operating in the discontinuous conduction mode Dmode or the DC-DC converter 10C is designed to operate in only the discontinuous conduction mode Dmode, the optimum dead-time determiner 19f is operative to determine a value of the dead time DT such that the power conversion efficiency $\eta$ of the power converter 10C is maximized in its predetermined total range within which the power conversion efficiency 11 can vary. Specifically, the optimum dead-time determiner 19f is operative to output a dead-time control signal Ctrl indicative of the determined optimum value of the dead time DT, and instructs the pulse generator 15d to switch the dead time DT to the determined optimum value. How to optimally determine the dead time DT by the optimum-dead-time determiner 19f will be described later.

As illustrated in FIG. 9, the power converter 10C according to the fourth embodiment can be provided with a peak detector 19h. The peak detector 19h, which is operatively connected to the first measuring unit 13a and to the optimum dead-time determiner 19f, is operative to measure local peaks in the measured input-current values Id output from the first measuring unit 13a, and output the measured local peaks as current peaks Ipeak. The peak detector 19h can be freely designed to measure and output local peaks Ipeak in the measured input-current values Id output from the first measuring unit 13a. For example, in the fourth embodiment, the peak detector 19h can be designed as a circuit illustrated in FIG. 10 or a circuit illustrated in FIG. 11.

Figure 10:
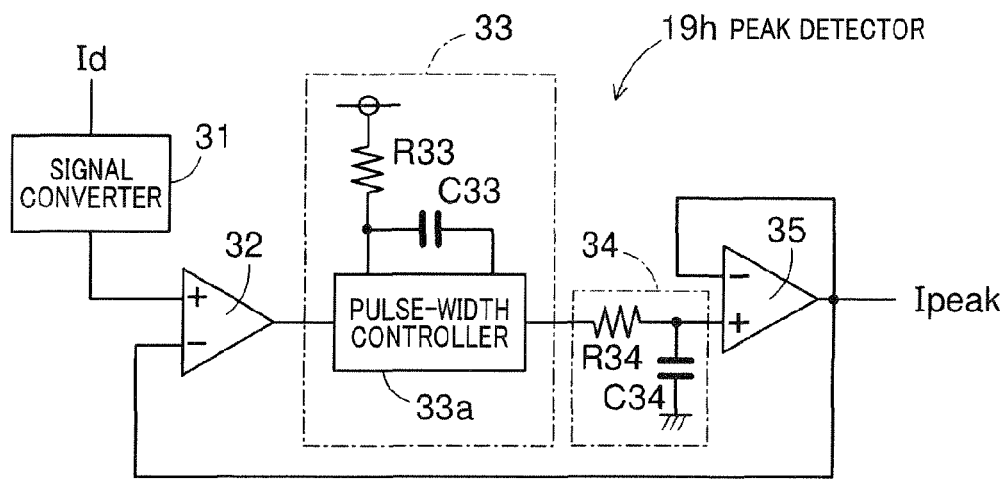
FIG. 10 is a circuit diagram schematically illustrating an example of the structure of a peak detector illustrated in FIG. 9.

The peak detector 19h illustrated in FIG. 10 is comprised of a signal converter 31, a comparator 32, a pulse-width control unit 33, an integrator 34, and a buffer amplifier 35.

The signal converter 31 is operative to receive the measured input-current value Id, convert the measured input-current value Id into a voltage signal, and output the voltage signal to the comparator 32.

The comparator 32 is operative to subtract a voltage peak signal fed back from the buffer amplifier 35, described later, from the voltage signal input from the signal converter 31, thus outputting a pulse voltage signal when the voltage signal input from the signal converter 31 is equal to or higher than the output voltage signal fed back from the buffer amplifier 35.

The pulse-width controller 33 is comprised of a pulse-width controller 33a and a CR circuit consisting of a capacitor C33 and a resistor R33. The pulse-width controller 33a is operative to elongate the pulse width of the pulse voltage signal based on a time constant defined by a capacitance of the capacitor C33 and a resistance of the resistor R33. That is, the pulse-width controller 33 is operative to elongate the width of the pulse voltage signal when the voltage signal input from the signal converter 31 is equal to or higher than the output voltage signal fed back from the buffer amplifier 35, and stop the increase of the width of the pulse signal when the voltage signal input from the signal converter 31 is lower than the output voltage signal fed back from the buffer amplifier 35. Thus, the width of the pulse voltage signal corresponds to the present peak of the measured input-current values Id. As the pulse-width controller 31, a given circuit capable of elongating the width of the pulse voltage signal, such as a monostable multivibrator, can be used.

The integrator 34 is comprised of a resistor R34 and a capacitor C34, and operative to integrate the pulse voltage signal output from the pulse-width controller 33 based on a time constant defined by a capacitance of the capacitor C34 and a resistance of the resistor R34, thus converting the pulse voltage signal into a DC voltage signal corresponding to the present peak of the measured input-current values Id. The buffer amplifier 35, which is designed as a voltage follower, is operative to output the DC voltage signal input from the integrator 34 as a voltage peak signal corresponding to a current peak Ipeak while converting a high input impedance level into a low output impedance level.

Figure 11:
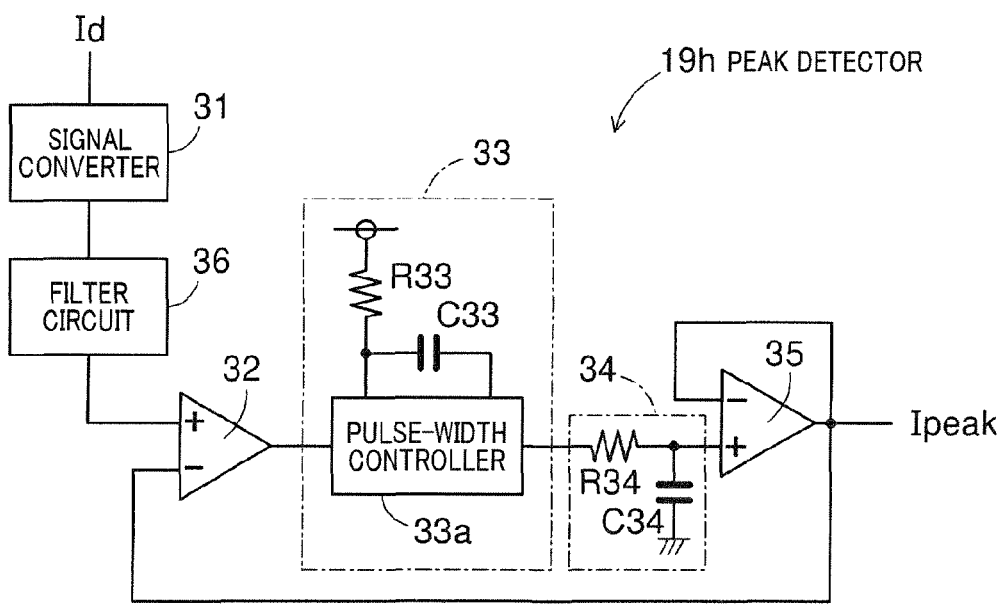
FIG. 11 is a circuit diagram schematically illustrating another example of the structure of a peak detector illustrated in FIG. 9.

The peak detector 19h illustrated in FIG. 11 is further comprised of a filter circuit 36 in addition to the circuit structure illustrated in FIG. 10. The filter circuit 36 is provided between the signal converter 31 and the comparator 32. The filter circuit 36 is designed as a high-pass filter or a band-pass filter.

The filter circuit 36 designed as a high-pass filter is operative to attenuate frequency components lower than a target frequency, i.e. a cutoff frequency, contained in the measured input-current values Id while passing high frequency components contained in the measured input-current values Id. For example, as described later, the filter circuit 36 designed as a high-pass filter should be designed to pass high frequency components contained in the measured input-current values Id, which are higher than a target frequency f13 illustrated in FIG. 13 or than a target frequency f22 illustrated in FIG. 22, without attenuating them.

The filter circuit 36 designed as a band-pass filter is operative to pass frequency components within a target frequency range contained in the measured input-current values Id while attenuating frequency components out of the target frequency range contained in the measured input-current values Id. For example, as described later, the filter circuit 36 designed as a band-pass filter should be designed to pass frequency components within a target frequency range W2 illustrated in FIG. 16 or a target frequency range W4 illustrated in FIG. 22, which are contained in the measured input-current values Id, without attenuating them.

Figure 12:
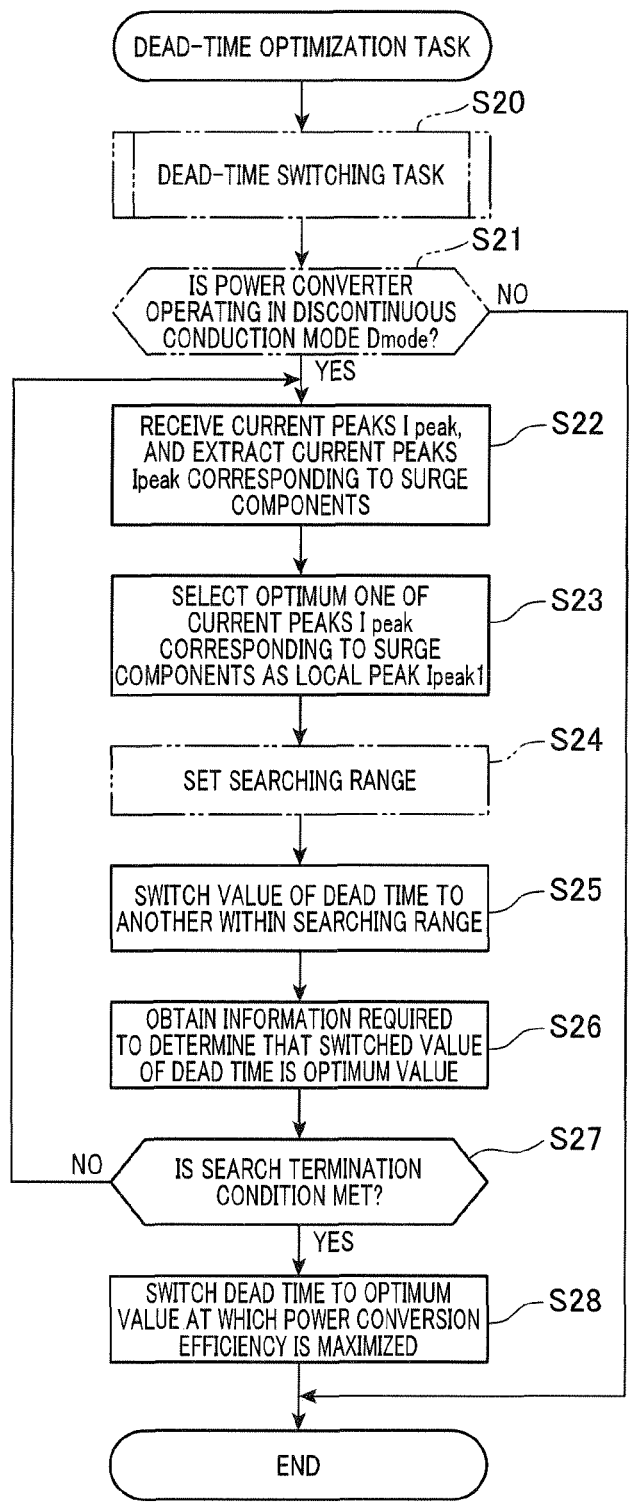
FIG. 12 is a flowchart schematically illustrating an example of specific operations of a dead-time optimization task carried out by the feedback unit illustrated in FIG. 9.

FIG. 12 schematically illustrates specific operations of a dead-time optimization task carried out by the feedback unit 19 as a function of the dead-time control unit 19e. The feedback unit 19 periodically performs the dead-time optimization task while the power converter 10 is operating.

In the dead-time optimization task illustrated in FIG. 12, the dead-time control unit 19e, i.e. the mode determiner 19g or the optimum dead-time determiner 19f, performs the dead-time switching task illustrated in FIG. 2 in step S20.

Following the operation in step S20, the dead-time control unit 19e determines whether the power converter 10C is operating in the discontinuous conduction mode Dmode with the dead time DT being set to the second time value $(\alpha+\beta)$ in step S21. The operations in steps S20 and S21 are carried out when the power converter 10C is designed to operate in both the continuous conduction mode Cmode and the discontinuous conduction mode Dmode1 When the power converter 10C is designed to operate in only the discontinuous conduction mode Dmode, the dead-time control unit 19e starts to perform the dead-time optimization task from step S22 described later.

Upon determination that the power converter 10C is operating in the continuous conduction mode Cmode (NO in step S21), the dead-time control unit 19e terminates the dead-time optimization task.

Otherwise, upon determination that the power converter 10C is operating in the discontinuous conduction mode Dmode (YES in step S21), the dead-time control unit 19e performs the operation in step S22.

Specifically, if the power converter 10C is provided with the peak detector 19h, the dead-time controller 19e extracts current peaks Ipeak corresponding to surge components contained in the current peaks Ipeak detected by the peak detector 19h while separating current peaks Ipeak corresponding to ringing components contained in the current peaks Ipeak detected by the peak detector 19h in step S22.

If the dead-time controller 19e receives current peaks Ipeak based on the input-current value Id measured by the first measuring unit 13a and current peaks Ipeak based on the input-current value Id measured by a first measuring unit 13d illustrated in FIG. 20 described later, in step S22, the dead-time control unit 19e:

extracts current peaks Ipeak corresponding to surge components contained in the current peaks Ipeak detected by the peak detector 19h based on the input-current value Id measured by the first measuring unit 13a; and extracts current peaks Ipeak based on the input-current value Id measured by the first measuring unit 13d.

Then, in step S23, the dead-time control unit 19e selects an optimum one of the current peaks Ipeak corresponding to surge components as a local peak Ipeak1.

Otherwise if the power converter 10C is not provided with the peak detector 19h, the dead-time controller 19e sets a searching range of the dead time DT within which a value of the dead time DT should be searched; a searched value of the power conversion efficiency η of the power converter 10C is maximized in the searching range in step S24. Once the dead-time control unit 19e has completed the searching range in step S24 in a present cycle of the dead-time optimization task, the dead-time control unit 19e eliminates the operation in step S24 in the next cycles of the dead-time optimization task. The dead-time control unit 19e can perform the operation in step S24 as necessary.

Then, the dead-time control unit 19e switches a present value of the dead time DT to another within the searching range for, for example, every switching cycle in step S25, and obtains information required to determine that a switched value of the dead time DT is an optimum value in step S26. Specifically, in step S25, the feedback control based on the feedback unit 19 and drive of the switching elements Q1 to Q4 based on the results of feedback control are cyclically carried out in accordance with the value of the dead time DT (see FIG. 6).

For example, if the local peak Ipeak1 has been selected in step S23, the dead-time control unit 19e obtains the local peak Ipeak1 as the information. If the dead-time control unit 19e has not performed the operation in step S23, the dead-time control unit 19e calculates a present value of the power conversion efficiency η of the power converter 10C or a corresponding value of power loss PL produced in the power converter 10C within the searching range based on at least one of: the input-current value Id measured by the first measuring unit 13a, the voltage value Vd1 measured by the second measuring unit 13b, the voltage value Vd2 measured by the output measuring unit 1A, the feedback controlled variable Iref output from the feedback controller 19b, and so on.

That is, when it is determined that the switched value of the dead time DT is the optimum value, the corresponding value of the power conversion efficiency η of the power converter 10C is maximized in the searching range. In other words, when it is determined that the switched value of the dead time DT is the optimum value, the corresponding value of power loss PL produced in the power converter 10C is minimized in the searching range.

Following the operation in step S26, the dead-time control unit 19e determines whether at least one of predetermined search termination conditions is met in step S27. The predetermined search termination conditions include, for example, the optimum value of the dead time DT has been searched or the search has been completed over the searching range.

Upon determination that at least one of the predetermined search termination conditions is not met (NO in step S27), the dead-time control unit 19e repeats the operations in steps S22 to S27 until the determination is affirmative in step S27.

Thus, upon determination that at least one of the predetermined search termination conditions is met (YES in step S27), the dead-time control unit 19e switches the present value of the dead time DT to the optimum value thereof at which the corresponding value of the power conversion efficiency η of the power converter 10C is maximized in the searching range, thus optimizing the dead time DT in step S28. Thereafter, the dead-time control unit 19e terminates the dead-time optimization task. Note that, in step S28, if the present value of the dead time DT is the optimum value thereof, the dead-time control unit 19e cannot perform the operation in step S28.

Next, the dead-time optimization task will be further described in more detail.

Figure 13:
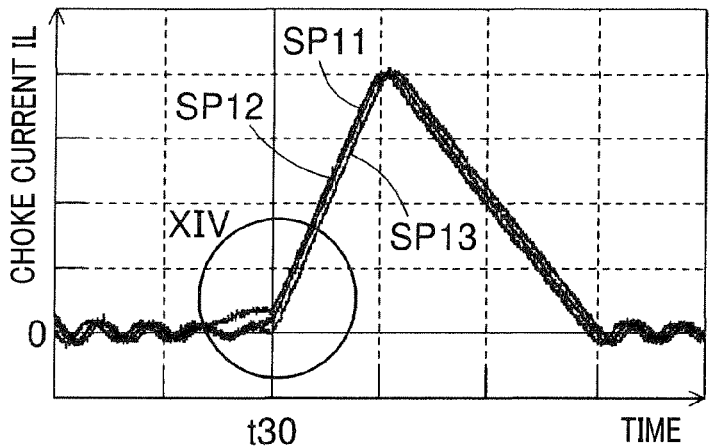
FIG. 13 is a graph schematically illustrating how a choke current flowing through a coil varies according to the fourth embodiment.
Figure 14:
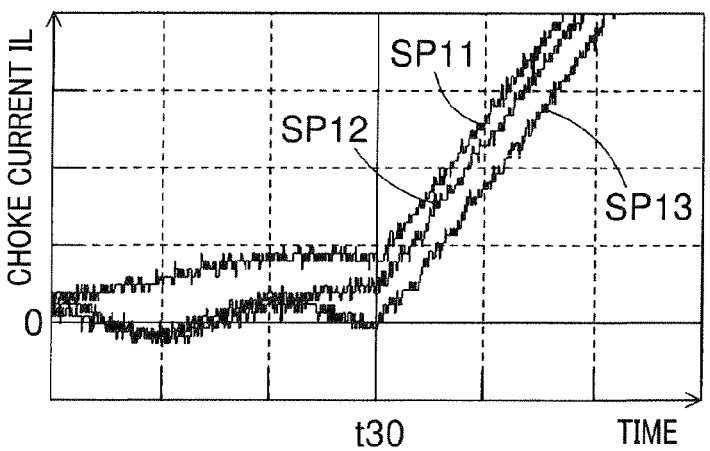
FIG. 14 is an enlarged view of the circled region XIV in FIG. 13.

Let us consider a case where drive, especially turn-on, of one switching element in the switch circuit 11A, such as the switching element Q1, is carried out while the dead time DT is cyclically changed during the power converter 10C being operating in the discontinuous conduction mode. In this case, the choke current IL flowing through the coil L12 varies as illustrated in FIGS. 13 and 14. FIG. 14 is an enlarged view of the circled region XIV in FIG. 13. In FIGS. 13 and 14, characteristic curves SP11 to SP13 show how the choke current IL varies over time when a value of the dead time DT for the characteristic curve SP1 is set to be higher than that of the dead time DT for the characteristic curve SP2, and the value of the dead time DT for the characteristic curve SP2 is higher than that of the dead time DT for the characteristic curve SP3. In other words, the duty D11 of the switching element based on the value of the dead time DT for the characteristic curve SP11 is set to be lower than the duty D12 of the switching element based on the value of the dead time DT for the characteristic curve SP12, and the duty D12 of the switching element based on the value of the dead time DT for the characteristic curve SP12 is set to be lower than the duty D13 of the switching element based on the value of the dead time DT for the characteristic curve SP13.

In FIGS. 13 and 14, reference character t30 represents a timing at which drive of the switching element is carried out for a corresponding switching cycle during which each of the characteristic curves SP11 to SP13 was measured. Actually, the timings at which drive of the switching element are carried out for respective switching cycles during which the corresponding characteristic curves SP11 to SP13 were measured are slightly different from each other depending on the different values of the dead time DT. However, in FIGS. 13 and 14, the timings are aligned with each other.

Note that the power converter 10C according to the fourth embodiment is designed to control switching of each of the switching elements Q1 to Q4 such that the amount of power, that is, the electrical energy, required by the load Z and the output voltage Vout per pulse cycle Ts (see FIG. 6) is kept constant.

At that time, the inventors have found that, although values D11 to D13 of the duty of the switching element for the respective characteristic curves SP11 to SP13 are in the order of D13>D12>D11, values η11, η12, and η13 of the power conversion efficiency η of the power converter 10C for the respective characteristic curves SP11, SP12, and SP13 are in the order of η12>η11>η13. That is, the inventors have found that, even if a value of the dead time DT at which the duty is set to be minimized is used, the maximum value of the power conversion efficiency η of the power converter 10C cannot be achieved. This results from the following reason:

The duty of the switching element is determined based on the amount of power required by the load Z per pulse cycle Ts. In FIGS. 13 and 14, because the amount of power, that is, the electrical energy, required by the load Z and the output voltage Vout per pulse cycle Ts is kept constant, the duty for the switching element is determined based on the integrated value of the choke current IL per pulse cycle Ts. In addition, because the amount of power, that is, the electrical energy, required by the load Z and the output voltage Vout per pulse cycle Ts is kept constant, the integrated values of the choke current IL of the respective characteristic curves SP11, SP12, and SP13 are equal to each other.

Next, as illustrated in FIGS. 13 and 14, from the time t30, the choke current IL of each of the characteristic curves SP11, SP12, and SP13 varies with the same gradient independently of the different values of the dead time DT for the respective characteristic curves SP11, SP12, and SP13. Thus, the higher the level of the choke current IL of each of the characteristic curves SP11, SP12, and SP13 at the time t30 is, the lower a value of the duty of the switching element for a corresponding characteristic curves SP11, SP12, and SP13 is taken.

That is, how the choke current IL varies during each switching element being off contributes to transfer of power per unit of time after turn-on of a corresponding switching element.

Particularly, when the power converter 10C is operating in the discontinuous conduction mode Dmode, how the choke current IL have varied over time before the time t30 and the level of the choke current IL at the time t30 depend on: each time when the choke current IL becomes zero; the resonant frequency of the power converter 10C; and the dead time DT, and therefore do not depend directly on a corresponding value of the power conversion efficiency η of the power converter 10C.

Thus, even if a value of the dead time DT at which the duty is set to be minimized is used, the maximum value of the power conversion efficiency η of the power converter 10C cannot be achieved. In view of the reason, the power converter 10C according to the fourth embodiment is designed to search a value of the dead time DT at which a corresponding value of the power conversion efficiency η of the power converter 10C is maximized and use the searched value of the dead time DT while the power converter 10C is operating in the discontinuous conduction mode Dmode.

Thus, in steps S22 to S27, the dead-time control unit 19e performs the search for selecting a value of the dead time DT at which the maximum value of the power conversion efficiency η is achieved.

Figure 15:
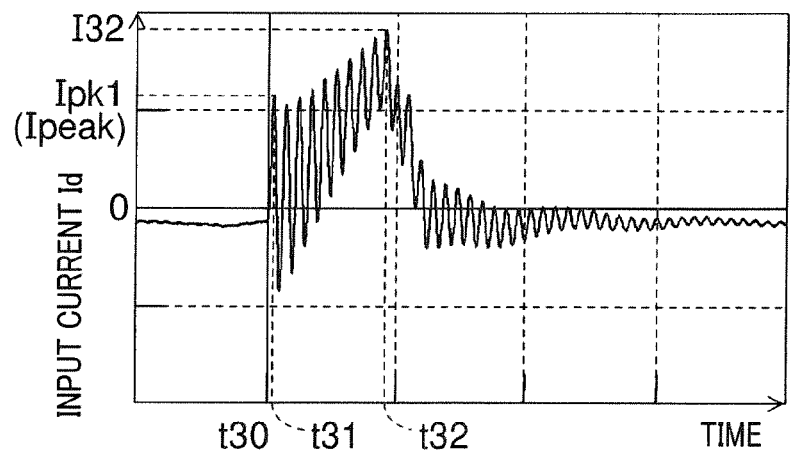
FIG. 15 is a graph schematically illustrating a waveform indicative of how measured input-current values vary over time according to the fourth embodiment.
Figure 16:
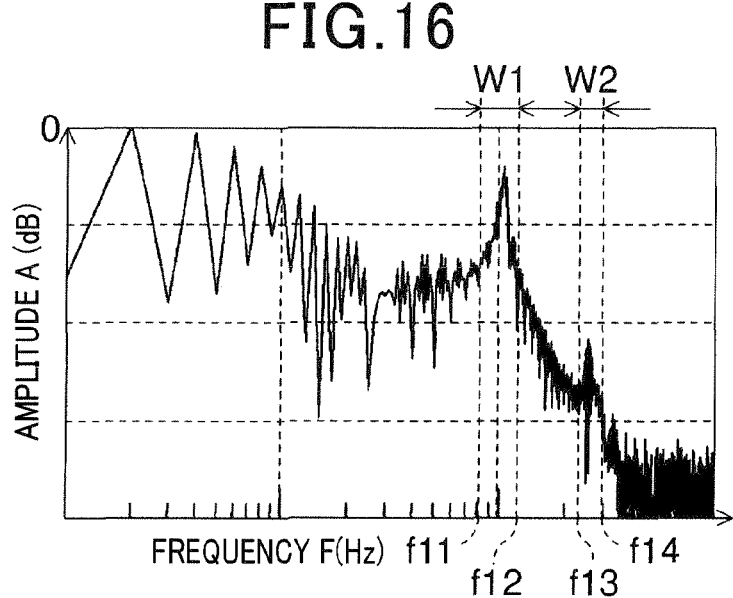
FIG. 16 is a graph schematically illustrating amplitude-frequency characteristics of harmonics contained in the measured input-current values when the amplitude of a fundamental wave is set to 0 dB according to the fourth embodiment.

FIG. 15 schematically illustrates a waveform indicative of how the measured input-current values Id vary over time, and FIG. 16 schematically illustrates amplitude-frequency characteristics, i.e. gain-frequency characteristics, of the harmonics contained in the measured input-current values Id when the amplitude of the fundamental wave is set to 0 dB. In FIG. 16, the vertical axis represents the amplitudes A of the harmonics, and the horizontal axis represents switching frequency F to be logarithmic.

As illustrated in FIG. 15, independently of the variations in the dead time DT, a local peak Ipk1 appears in the waveform at time t31 immediately after the time t30, and thereafter, a highest value I32 appears in the waveform at time t32. The local peak Ipk1 correlates with the amplitude A of a harmonic whose frequency is contained in a predetermined frequency range W2 defined from a frequency f13 to a frequency f14 illustrated in FIG. 16; the frequency range W2 corresponds to the surge components. A predetermined frequency range W1 defined from a frequency f11 to a frequency f12 illustrated in FIG. 16 corresponds to the ringing components. The greater the amplitudes A of the ringing components are, the greater the amplitudes of ripples are, and the greater the amplitudes of the surge components are, the higher the level of the local peak Ipk1 is (see the operations in steps S22 to S24).

Figure 17:
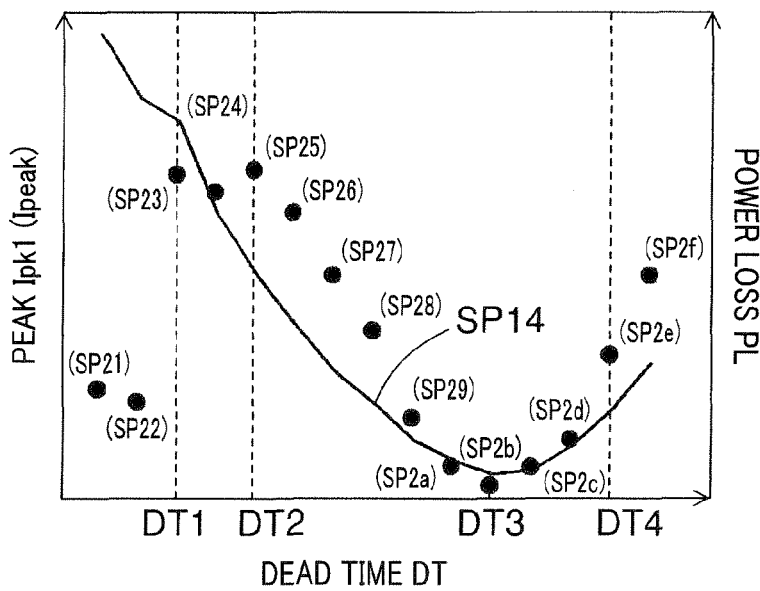
FIG. 17 is a graph schematically illustrating an example of the variation in local peaks obtained in steps S22 to S24 of FIG. 12 while a value of a dead time is changed in step S25 of FIG. 12 according to the fourth embodiment.

FIG. 17 schematically illustrates an example of the variation in the local peaks Ipk1 obtained in steps S22 to S24 while a value of the dead time DT is changed in step S25; the local peaks Ipk1 are illustrated in black dots. FIG. 17 also schematically illustrates a characteristic curve SP14 indicative of the variation in the power loss PL produced in the power converter 10C. FIG. 17 demonstrates that the variation in the local peaks Ipk1 correlates with that in the power loss PL produced in the power converter 10C as long as values of the dead time DT corresponding to the local peaks Ipk1 are included in the range from a value DT1 to a value DT4. Particularly, an approximate curve based on the local peaks Ipk1 corresponding to values of the dead time DT included in the range from a value DT2 to the value DT4 vary correlating with the characteristic curve SP14 indicative of the variation in the power loss PL while the input voltage Vin, the output voltage Vout, and the load current Iout are given values.

Figure 18:
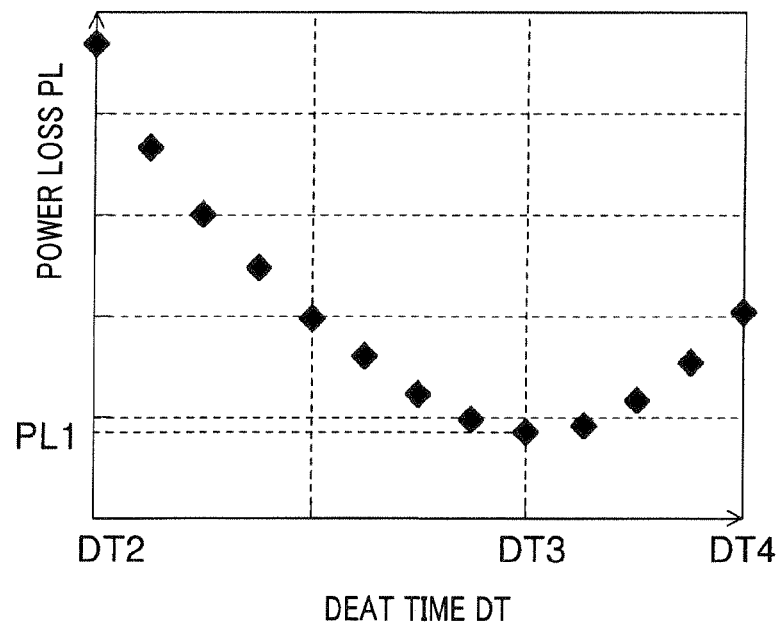
FIG. 18 is a graph schematically illustrating a first example of the variation in power loss based on variation of the dead time according to the fourth embodiment.
Figure 19:
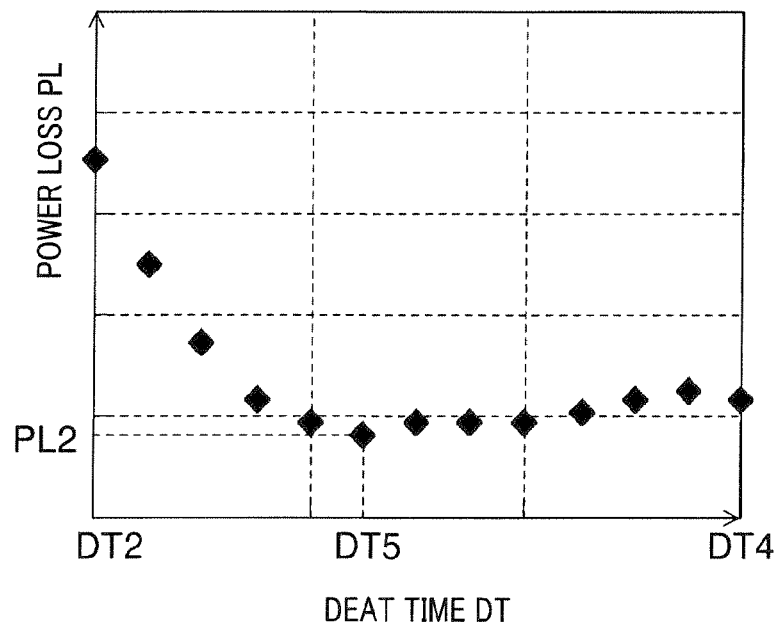
FIG. 19 is a graph schematically illustrating a second example of the variation in power loss based on variation of the dead time according to the fourth embodiment.

FIG. 18 schematically illustrates a first example of the variation in the power loss PL within the range from the local peak Ipk1 corresponding to the value DT2 of the dead time DT to the local peak Ipk1 corresponding to the value DT4 thereof. In addition, FIG. 19 schematically illustrates a second example of the variation in the power loss PL within the range from the local peak Ipk1 corresponding to the value DT2 of the dead time DT to the local peak Ipk1 corresponding to the value DT4 thereof while the input voltage Vin, the output voltage Vout, and the load current Tout are different from the values of them illustrated in FIG. 18.

Thus, in steps S22 to S27, the dead-time control unit 19e searches for a value of the dead time DT at which a corresponding value of the power loss PL produced in the power converter 10C is minimized in the searching range, in other words, a corresponding value of the power conversion efficiency η is maximized within the searching range.

For example, as illustrated in FIG. 17, the dead-time control unit 19e sets the searching range of the dead time DT from the value DT2 of the dead time DT to the value DT4 thereof in step S24. This is because the local peaks Ipk1 corresponding to values of the dead time DT included in the range from the value DT2 to the value DT4 of the dead time DT vary correlating with the characteristic curve SP14 indicative of the variation in the power loss PL.

Then, in steps S22 to S27, while varying the dead time DT from the higher value DT4 to the lower value DT2, as illustrated in FIG. 18, the dead-time control unit 19e understands that:

at a value DT3 of the dead time DT, the power loss PL becomes a lowest value PL1;

the power loss PL increases with an increase of the dead time DT from the value DT3; and the power loss PL increases with a decrease of the dead time DT from the value DT3.

Thus, in steps S27 and S28, the dead-time control unit 28 switches the present value of the dead time DT to the value DT3 thereof at which the corresponding value of the power loss PL is minimized in the searching range, in other words, a corresponding value of the power conversion efficiency η is maximized in the searching range. This optimizes a value of the dead time DT at which the corresponding value of the power conversion efficiency η becomes maximum.

As another example illustrated in FIG. 19, the dead-time control unit 19e sets the searching range of the dead time DT from the value DT2 of the dead time DT to the value DT4 thereof in step S24.

Then, in steps S22 to S27, while varying the dead time DT from the higher value DT4 to the lower value DT2, the dead-time control unit 19e understands that:

at a value DT5 of the dead time DT, the power loss PL becomes a lowest value PL2;

the power loss PL slightly increases with an increase of the dead time DT from the value DT5; and the power loss PL increases with a decrease of the dead time DT from the value DT5.

Thus, in steps S27 and S28, the dead-time control unit 28 switches the present value of the dead time DT to the value DT5 thereof at which the corresponding value of the power loss PL is minimized in the searching range, in other words, a corresponding value of the power conversion efficiency η is maximized in the searching range. This optimizes a value of the dead time DT at which the corresponding value of the power conversion efficiency η becomes maximum. Note that, as illustrated in FIG. 17, at the value DT3 of the dead time DT, the corresponding local peak Ipk1 becomes a minimum value or becomes a value close to the minimum value in the searching region defined from the value DT2 to the DT4 of the dead time DT. Similarly, at the value DT5 of the dead time DT, the corresponding local peak Ipk1 becomes a minimum value or becomes a value close to the minimum value in the searching region defined from the value DT2 to the DT4 of the dead time DT. This is because the variation in the local peaks Ipk1 correlates with that of the power loss PL.

As described above, the configuration of the power converter 10C according to the fourth embodiment drives the switching elements Q1 to Q4 using a value of the dead time DT at which a corresponding value of the power conversion efficiency η of the power converter 10C is maximized, in other words, a corresponding value of the power loss PL produced in the power converter 10C is minimized while the power converter 10C is operating in the discontinuous conduction mode Dmode.

Specifically, the power converter 10C is comprised of the dead-time control unit 19e that determines a value of the dead time DT at which a corresponding value of the power conversion efficiency η of the power converter 10C is maximized as a function of at least one of: a first measured value of a first electrical parameter depending on input power to, for example, the primary winding L1 of the switch circuit 11A, such as the measured voltage value Vd1;

a second measured value of a second electrical parameter depending on output power from, for example, the secondary winding L2 of the switch circuit 11A, such as the measured voltage value Vd2; and the feedback controlled variable Iref.

The configuration achieves a technical effect of improving the power conversion efficiency η while the power converter 10C is operating in the discontinuous conduction mode Dmode in addition to the same technical effects as those achieved by the power converter 10 according to the first embodiment.

The dead-time control unit 19e of the power converter 10C is comprised of the mode determiner 19g and the optimum dead-time determiner 19f. The mode determiner 19g is configured to determine whether the DC-DC converter 10C is operating in the discontinuous conduction mode Dmode. The optimum dead-time determiner 19f is configured to determine an optimum value of the dead time DT at which a corresponding value of the power conversion efficiency η of the power converter 10C is maximized if it is determined that the DC-DC converter 10C is operating in the discontinuous conduction mode Dmode (see FIG. 9). This configuration more reliably improves the power conversion efficiency η of the power converter 10C in the discontinuous conduction mode Dmode of the power converter 10C.

The power converter 10C is further comprised of the peak detector 19h configured to measure and output current peaks Ipeak in the measured input-current values Id output from the first measuring unit 13a. Based on the current peaks Ipeak output from the peak detector 19h, the optimum dead-time determiner 19f is configured to:

extract current peaks Ipeak corresponding to surge components contained in the current peaks Ipeak detected by the peak detector 19h;

select an optimum one of the current peaks Ipeak corresponding to surge components as a local peak Ipeak1;

obtain the local peaks Ipeak1 while changing a value of the dead time DT; and select one of the changed values of the dead time DT at which the corresponding local peak Ipeak1 is minimized, which represents a corresponding value of the power conversion efficiency η is maximized.

Thus, it is possible to more reliably improve the power conversion efficiency η of the power converter 10C in the discontinuous conduction mode Dmode of the power converter 10C.

Figure 22:
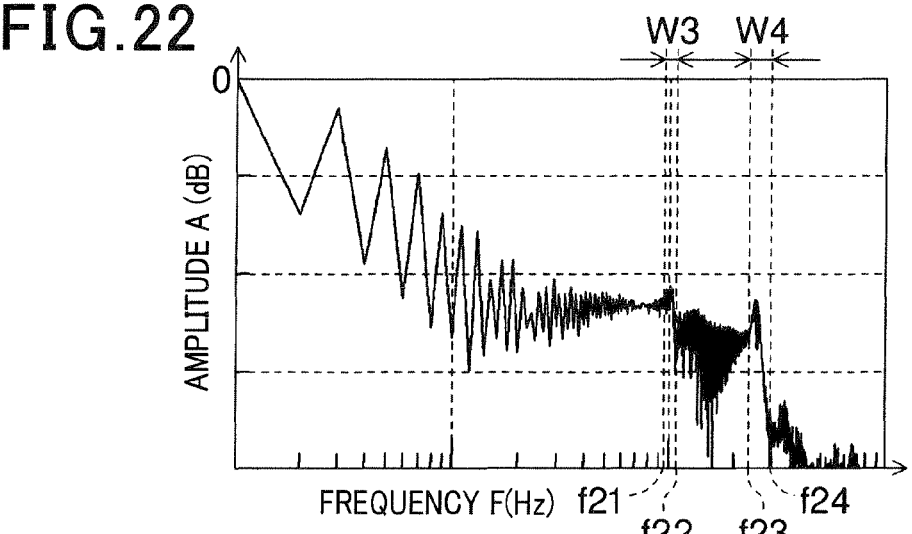
FIG. 22 is a graph schematically illustrating amplitude-frequency characteristics of harmonics contained in the measured input-current values when the amplitude of a fundamental wave is set to 0 dB according to the fifth embodiment.

The peak detector 19h is comprised of the filter circuit 36 serving as a high-pass or band-pass filter for passing frequency components within the target frequency range W2 illustrated in FIG. 16 or the a target frequency range W4 illustrated in FIG. 22, which are contained in the measured input-current values Id, without attenuating them. This reliably obtains the frequency components of the measured input-current values Id within a target frequency range even if noise is contained in the measured input-current values Id, thus more reliably improving the power conversion efficiency η of the power converter 10C in the discontinuous conduction mode Dmode of the power converter 10C independently of such noise.

Figure 28:
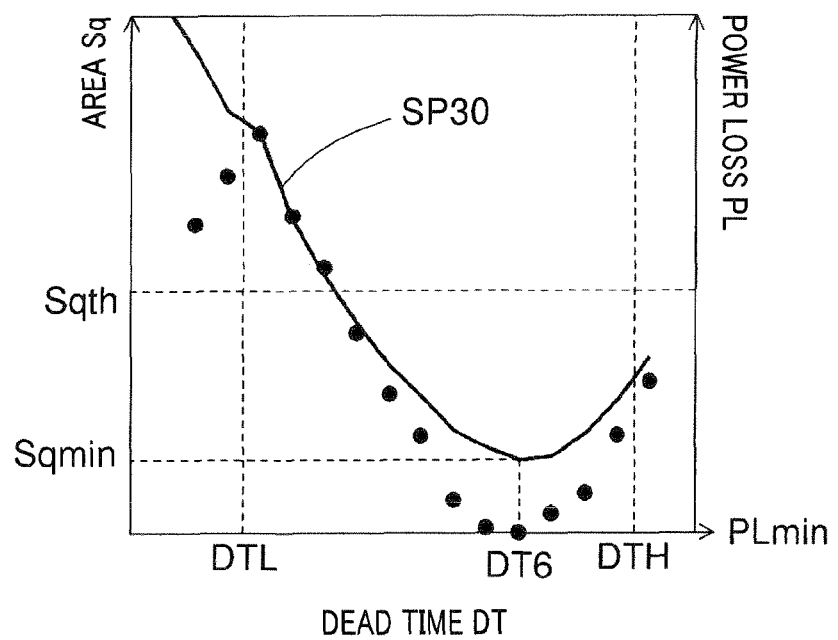
FIG. 28 is a graph schematically illustrating an example of the variation in areas obtained in step S26 of FIG. 12 while a value of the dead time is changed in step S25.

The dead-time control unit 19e, i.e. the optimum dead-time determiner 19f, is configured to search for an optimum value of the dead time DT at which a corresponding value of the power conversion efficiency η is maximized, i.e. a corresponding value of the power loss PL is minimized, while varying the dead time DT in its descending direction (see FIGS. 17 and 28). Then, the optimum dead-time determiner 19f switches a present value of the dead time DT to the searched optimum value. This configuration makes it possible to, even if the variation range of the dead time DT includes a region that does not correlate with the variation of the power conversion efficiency η, smoothly select an optimum value of the dead time DT at which a corresponding value of the power conversion efficiency η is maximized.

Fifth Embodiment

A power converter 10D according to a fifth embodiment of the present disclosure will be described hereinafter with reference to FIGS. 20 to 22.

The structure and/or functions of the power converter 10D according to the fifth embodiment are different from those of the power converter 10C according to the fourth embodiment by the following points. So, the different points will be mainly described hereinafter, and therefore, redundant descriptions of like parts between the first and fourth embodiments, to which like reference characters are assigned, are omitted or simplified.

The power converter 10D according to the fifth embodiment is provided with a first measuring unit 13d in place of the first measuring unit 13a located to be different from the first measuring unit 13a. Specifically, the first measuring unit 13d is located, for example, between one of the first and second ends of the primary winding L1 and a corresponding pair of series-connected switching elements. In FIG. 20, the first measuring unit 13d is located between the second end of the primary winding L1 and the pair of series-connected switching elements Q2 and Q4. The first measuring unit 13d is operative to measure a value of current flowing through the primary winding L1, which will be referred to as primary current. That is, the signal processor 17 is connected to the first measuring module 13d. The signal processor 17 is operative to calculate the sum of the slope signal Is and a measured value of the primary current as the measured input-current value Id to generate a value of composite current signal Ic, thus outputting the value of the composite current signal Ic to the signal comparator 16. In addition, the peak detector 19h is operatively connected to the first measuring unit 13d.

Figure 20:
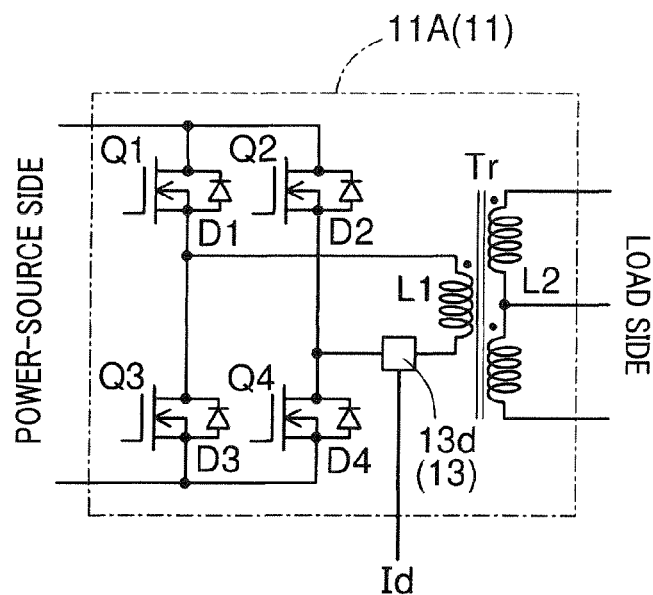
FIG. 20 is a circuit diagram schematically illustrating an example of a part of a power converter according to a fifth embodiment of the present disclosure.

As illustrated in FIG. 20, it is preferable that the first measuring unit 13d is located to be close to the primary winding L1 in order to accurately measure the primary current. That is, the first measuring unit 13d is preferably located within a predetermined range between the primary winding L1 and a corresponding pair of series-connected switching elements as long as it can accurately measure the primary current.

As described above, the dead-time control unit 19e according to the fifth embodiment is designed to perform the dead-time optimization task illustrated in FIG. 12.

Figure 21:
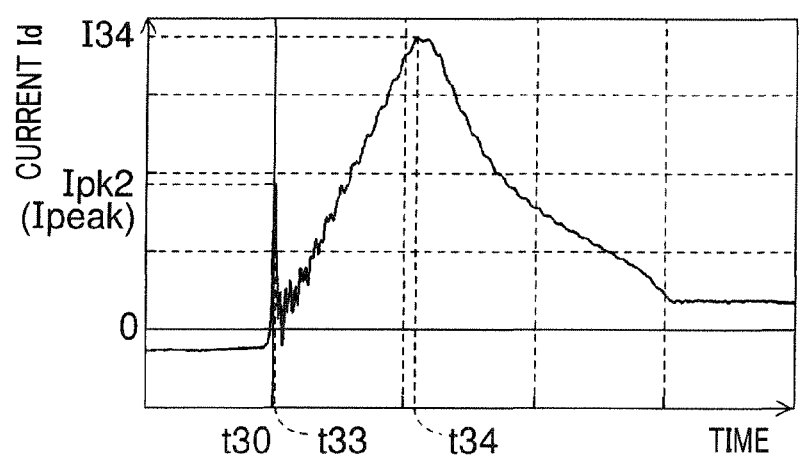
FIG. 21 a graph schematically illustrating a waveform indicative of how measured input-current values vary over time according to the fifth embodiment.

In the fifth embodiment, FIG. 21 schematically illustrates a waveform indicative of how the measured input-current values Id vary over time, and FIG. 22 schematically illustrates amplitude-frequency characteristics, i.e. gain-frequency characteristics of the harmonics contained in the measured input-current values Id when the amplitude of the fundamental wave is set to 0 dB. In FIG. 22, the vertical axis represents the amplitudes A of the harmonics, and the horizontal axis represents switching frequency F to be logarithmic.

As illustrated in FIG. 21, independently of the variations in the dead time DT, a local peak Ipk2 appears in the waveform at time t33 immediately after the time t30, and thereafter, a highest value I34 appears in the waveform at time t34. The local peak Ipk2 correlates with the amplitude A of a harmonic whose frequency is contained in a predetermined frequency range W4 defined from a frequency f23 to a frequency f24 illustrated in FIG. 22; the frequency range W4 corresponds to the surge components. A predetermined frequency range W3 defined from a frequency f21 to a frequency f22 illustrated in FIG. 22 corresponds to the ringing components. In comparison to FIG. 16 according to the fourth embodiment, it is possible to easily extract current peaks Ipeak corresponding to surge components contained in the current peaks Ipeak detected by the peak detector 19h based on the input-current values Id measured by the first measuring unit 13d.

In the fifth embodiment, the variation in the local peaks Ipk2 and the variation in the power loss PL produced in the power converter 10D while the input voltage Vin, the output voltage Vout, and the load current Iout are given values are obtained like FIG. 17 according to the fourth embodiment. In the fifth embodiment, the relationship between the variation in the power loss PL and that in the dead time DT while the input voltage Vin, the output voltage Vout, and the load current Iout are different from the values of them illustrated in FIG. 18.

Thus, in steps S27 and S28, the dead-time control unit 28 switches the present value of the dead time DT to a value DT3 or DT5 thereof at which the corresponding value of the power loss PL is minimized in the searching range, in other words, a corresponding value of the power conversion efficiency η is maximized in the searching range. This optimizes a value of the dead time DT at which the corresponding value of the power conversion efficiency η becomes maximum.

As described above, the configuration of the power converter 10D according to the fifth embodiment drives the switching elements Q1 to Q4 using a value of the dead time DT at which a corresponding value of the power conversion efficiency η of the power converter 10D is maximized, in other words, a corresponding value of the power loss PL produced in the power converter 10D is minimized while the power converter 10D is operating in the discontinuous conduction mode Dmode. The configuration therefore achieves a technical effect of improving the power conversion efficiency η while the power converter 10D is operating in the discontinuous conduction mode Dmode in addition to the same technical effects as those achieved by the power converter 10 according to the first embodiment.

In addition the first measuring unit 13d is located within a predetermined range between the primary winding L1 and a corresponding pair of series-connected switching elements as long as it can accurately measure the primary current. This configuration more accurately measures the input current Iin flowing through the primary current as the measured input-current values Id. This results in more improvement of the power conversion efficiency η in the discontinuous conduction mode Dmode of the power converter 10D.

Sixth Embodiment

A power converter according to a sixth embodiment of the present disclosure will be described hereinafter with reference to FIGS. 23 to 28.

The structure and/or functions of the power converter according to the sixth embodiment are different from those of the power converter 10C according to the fourth embodiment or the power converter 10D according to the fifth embodiment by the following points. For example, the power converter according to the sixth embodiment is based on the power converter 10C according to the fourth embodiment. So, the different points will be mainly described hereinafter, and therefore, redundant descriptions of like parts between the first and fourth embodiments, to which like reference characters are assigned, are omitted or simplified.

Figure 23:
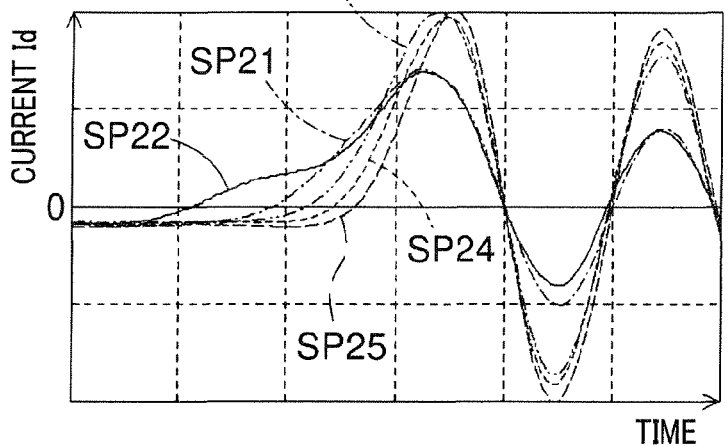
FIG. 23 is a graph schematically illustrating an example of some variation curves of corresponding local peaks illustrated as black dots in FIG. 17 according to a sixth embodiment of the present disclosure.
Figure 24:
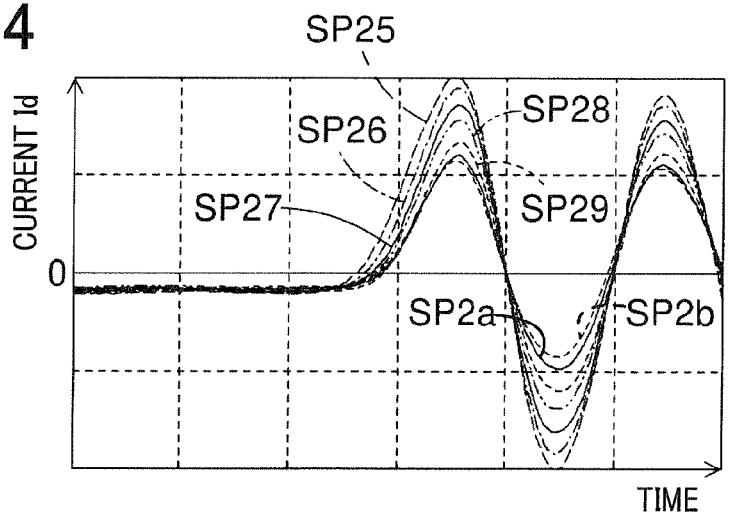
FIG. 24 is a graph schematically illustrating an example of some variation curves of corresponding local peaks illustrated as black dots in FIG. 17 according to the sixth embodiment.
Figure 25:
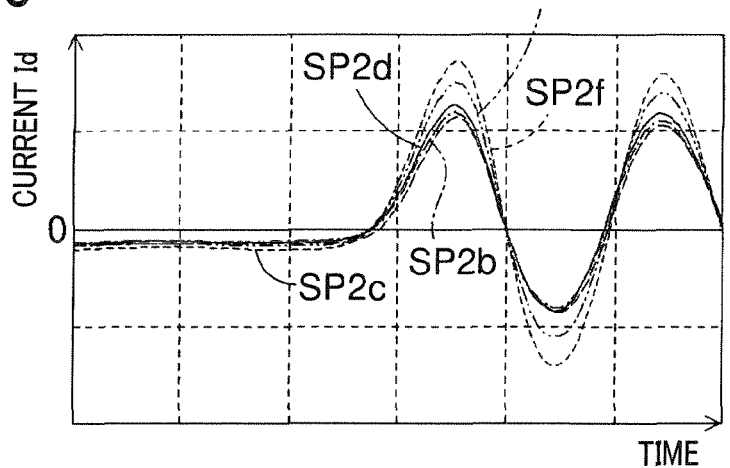
FIG. 25 is a graph schematically illustrating an example of some variation curves of corresponding local peaks illustrated as black dots in FIG. 17 according to the sixth embodiment.

The power converter according to the sixth embodiment is designed to determine a value of the dead time DT at which a corresponding value of the power conversion efficiency η thereof using the areas under the variation curves of the measured input-current values Id over time; these variation curves include the local peaks Ip1 illustrated as the black dots in FIG. 17. That is, the variation curves of the local peaks Ip1 illustrated as the black dots in FIG. 17 will be referred to as SP21, SP22, SP23, SP24, SP25, SP26, SP27, SP28, SP29, SP2a, SP2b, SP2c, SP2d, SP2e, and SP2f. The variation curves SP21 to SP25 are illustrated in FIG. 23 in the same waveforms as that illustrated in FIG. 15. The variation curves SP25 to SP29, SP2a, and SP2b are illustrated in FIG. 24 in the same waveforms as that illustrated in FIG. 15. The variation curves SP2b to SP2f are illustrated in FIG. 25 in the same waveforms as that illustrated in FIG. 15. Note that, in each of FIGS. 23 and 24, the variation curve SP25 is illustrated, and, in each of FIGS. 24 and 25, the variation curve SP2b is illustrated.

Comparing each of FIGS. 23 to 25 with FIG. 17 demonstrates that the variation curves SP21 and SP22 correlate weakly with the variation curve of the power loss PL, but the variation curves SP23 to SP29, SP2a, and SP2b correlate strongly with the variation curve of the power loss PL.

Specifically, in step S26, the dead-time control unit 19e according to the sixth embodiment calculates the area, i.e. the strength of the input current, between each of the variation curves SP21, SP22, SP23, SP24, SP25, SP26, SP27, SP28, SP29, SP2a, SP2b, SP2c, SP2d, SP2e, and SP2f and the horizontal axis representing the measured current values Id equal to zero. For example, FIG. 26 schematically illustrates the area Sq22 illustrated by hatching, between the variation curve SP22 and the horizontal axis, and FIG. 27 schematically illustrates the area Sq25, illustrated by hatching, between the variation curve SP25 and the horizontal axis.

The area under each of the variation curves SP21 to SP29, and SP2a to SP2f can be expressed as the integral of the corresponding measured current values Id under a corresponding variation curve over a given time period using one of various calculating methods. In place of the measured current values Id, the measured voltage values Vd1 or Vd2 can be used in place of or in addition to the measured current values Id. One of the various calculating methods is to calculate the sum of the current values Id of a target variation curve measured for every preset period, i.e. time interval, as the area under the target variation curve. Another one of the various calculating methods is to calculate the area of a target variation curve using a prepared equation that can calculate the area based on the corresponding local peak Ipk1 and a time period under the area.

In order to accelerate the speed required to calculate the area under a target variation curve, a simple calculating method can be used.

Figure 26:
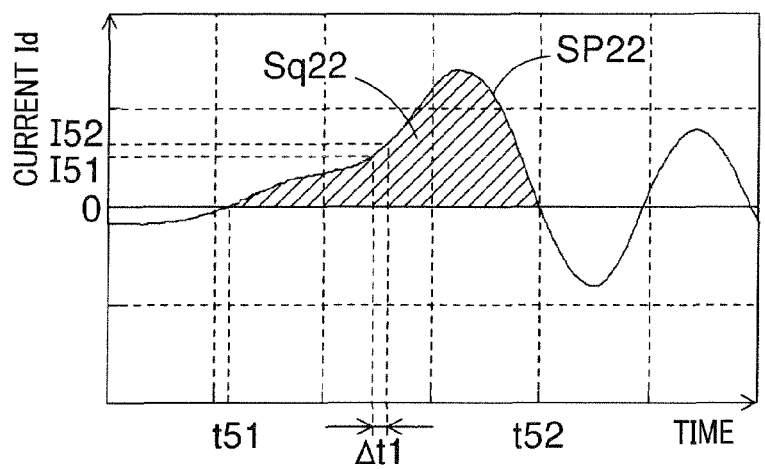
FIG. 26 is a graph schematically illustrating how to calculate an area, illustrated by hatching, between one variation curve and a horizontal axis according to the sixth embodiment.
Figure 27:
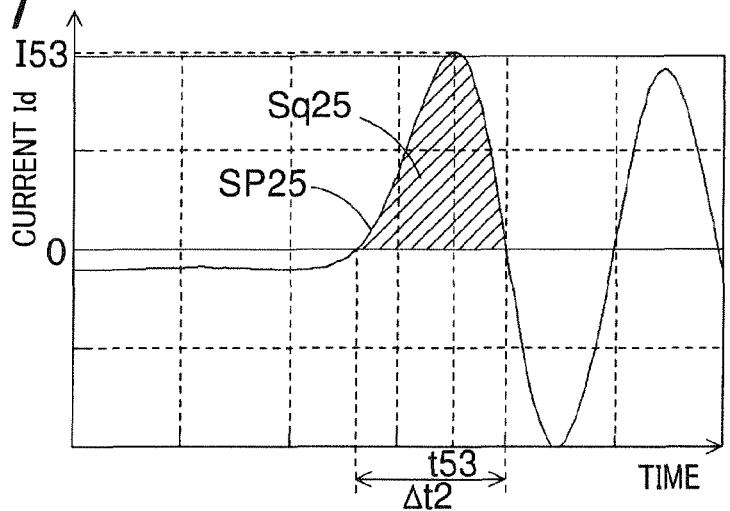
FIG. 27 is a graph schematically illustrating how to calculate an area, illustrated by hatching, between another variation curve and a horizontal axis according to the sixth embodiment.

For example, in a case illustrated in FIG. 26, the dead-time control unit 19e can obtain a measured current value I51 at a start point of a minute time interval $\Delta t1$ and a measured current value I52 at an end point of the minute time interval $\Delta t1$; the minute time interval $\Delta t1$ is within the time period from time t51 to time t52 under an area Sq22 to be calculated. Then, the dead-time control unit 19e can calculate an area S($\Delta t1$) under the variation curve SP22 within the minute time interval $\Delta t1$ using the formula for calculating the area of a trapezoid, which is expressed as:

$$S(\Delta t1) = \Delta t1 \times (I51 + I52)$$

The dead-time control unit 19e can calculate the sum of the areas S($\Delta tn$), where $\Delta tn$ is equal to divided minute time intervals from the time t51 to the time t52, thus calculating the area Sq2 under the variation curve SP22.

As another example, in a case illustrated in FIG. 27, the dead-time control unit 19e can obtain a current value I53 of the variation curve SP25 as the corresponding local peak Ipk1 at time t53 within the time period $\Delta t2$ under an area Sq25 to be calculated. Based on the formula for calculating the area of a triangle, the dead-time control unit 19e can calculate the area Sq25 under the variation curve SP25, which is expressed as follows:

$$Sq25 = \Delta t2 \times I53/2$$

Although not shown in the drawings, the dead-time control unit 19e can use a method of:

interpolating the measured current values Id of a target variation curve into a polynomial curve, such as a spline curve, a Bezier curve, a Lagrangian curve, or the like; and calculating the area under the interpolated polynomial curve as the area of the target variation curve.

FIG. 28 schematically illustrates an example of the variation in the areas Sq obtained in step S26 while a value of the dead time DT is changed in step S25; the areas Sq are illustrated in black dots. FIG. 28 also schematically illustrates a characteristic curve SP30 indicative of the variation in the power loss PL produced in the power converter according to the sixth embodiment. FIG. 28 demonstrates that the variation in the areas Sq correlates with that of the power loss PL as long as values of the dead time DT corresponding to the areas Sq are included in the range from a lower value DTL to a higher value DTH. Particularly, an approximate curve based on the areas Sq corresponding to values of the dead time DT included in the range from the lower value DTL to the higher value DTH vary correlating with the characteristic curve SP30 indicative of the variation in the power loss PL.

Thus, in steps S22 to S27, the dead-time control unit 19e searches for a value of the dead time DT at which a corresponding value of the power loss PL produced in the power converter according to the sixth embodiment is minimized in the searching range, in other words, a corresponding value of the power conversion efficiency η is maximized within the searching range.

For example, as illustrated in FIG. 28, the dead-time control unit 19e sets the searching range of the dead time DT from the lower value DTL of the dead time DT to the higher value DTH thereof in step S24.

Then, in steps S22 to S27, while varying the dead time DT from the higher value DTH to the lower value DTL, as illustrated in FIG. 28, the dead-time control unit 19e understands that:

the power loss PL decreases with a decrease of the dead time DT from the higher value DTH so as to become a lowest value PLmin at a value DT6 of the dead time DT; and the power loss PL increases with a decrease of the dead time DT from the value DT6.

Thus, in steps S27 and S28, the dead-time control unit 28 switches the present value of the dead time DT to the value DT6 thereof at which the corresponding value of the power loss PL is minimized in the searching range, in other words, a corresponding value of the power conversion efficiency η is maximized in the searching range. This optimizes a value of the dead time DT at which the corresponding value of the power conversion efficiency η becomes maximum. Note that, as illustrated in FIG. 28, at the value DT6 of the dead time DT, the corresponding area Sq becomes a minimum value or becomes a value close to the minimum value in the searching region defined from the value DTL to the DTH of the dead time DT. This is because the variation in the areas Sq correlates with that of the power loss PL.

As described above, the configuration of the power converter according to the sixth embodiment drives the switching elements Q1 to Q4 using a value of the dead time DT at which a corresponding value of the power conversion efficiency η of the power converter is maximized, in other words, a corresponding value of the power loss PL produced in the power converter is minimized while the power converter is operating in the discontinuous conduction mode Dmode. The configuration therefore achieves a technical effect of improving the power conversion efficiency 11 while the power converter is operating in the discontinuous conduction mode Dmode in addition to the same technical effects as those achieved by the power converter 10 according to the first embodiment.

Seventh Embodiment

Figure 29:
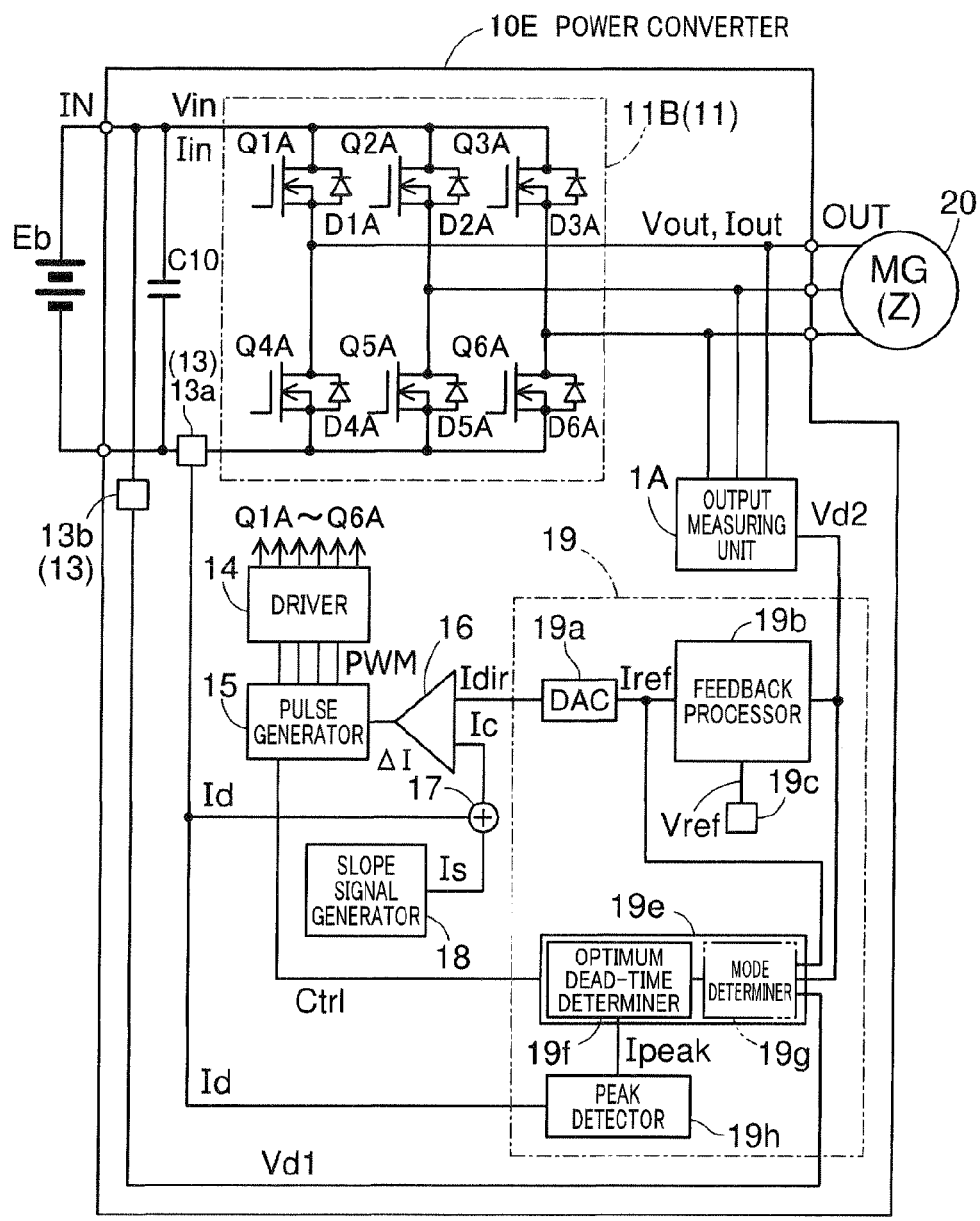
FIG. 29 is a circuit diagram schematically illustrating an example of the overall configuration of a power converter according to a seventh embodiment of the present disclosure.

A power converter 10E according to a seventh embodiment of the present disclosure will be described hereinafter with reference to FIG. 29.

The structure and/or functions of the power converter 10E according to the seventh embodiment are different from those of the power converter 10C according to the fourth embodiment by the following points. So, the different points will be mainly described hereinafter, and therefore, redundant descriptions of like parts between the fourth and seventh embodiments, to which like reference characters are assigned, are omitted or simplified.

The power converter 10E according to the fourth embodiment is comprised of the switch circuit 11B in place of the switch circuit 11A according to the fourth embodiment. The switch circuit 11B is operative to output a three-phase AC voltage as an example of periodic voltage signals whose at least one of voltage and frequency varies with time. The three-phase AC voltage is supplied to a three-phase rotary electric machine 20, such as a motor-generator (MG), as an example of inductive loads in place of the load Z. That is, the power converter 10E serves as a three-phase inverter.

Specifically, the power converter 10E according to the seventh embodiment is a modification of the power converter 10C according to the fourth embodiment like the power converter 10A, which is a modification of the power converter 10 according to the first embodiment.

The configuration of the power converter 10E according to the seventh embodiment is substantially identical to that of the power converter 10C according to the fourth embodiment except that the configurations of the switch circuit 11B and the load Z. The configuration therefore achieves the same effects as those achieved by the power converter 10C according to the fourth embodiment. Note that the power converter 10E can be designed as a modification of the power converter 10D according to the fifth embodiment, which also can achieve the same effects as those achieved by the power converter 10D according to the fifth embodiment. The power converter 10E can also be designed as a modification of the power converter according to the sixth embodiment, which also can achieve the same effects as those achieved by the power converter according to the sixth embodiment.

The first to seventh embodiments of the present disclosure and their modifications have been described, but the present disclosure is not limited thereto. Specifically, the first to seventh embodiments and their modifications can be freely changed within the scope of the present disclosure.

In each of the first to seventh embodiments, the dead-time control unit 19d, 19e is configured to initially determine the boundary condition Ith for the feedback controlled variable Iref in step S10, but the present disclosure is not limited thereto. Specifically, the boundary condition Ith for the feedback controlled variable Iref can be previously prepared and stored as boundary-condition information in the dead-time control unit 19d, 19e as one of the maps M. That is, the dead-time control unit 19d, 19e can have the boundary condition Ith. In other words, the dead-time control unit 19d, 19e can be configured to have the boundary-condition information. Thus, in step S10, the dead-time control unit 19d, 19e can read the boundary-condition information therefrom.

In each of the first to seventh embodiments, the dead-time control unit 19d, 19e is configured to initially determine or update the boundary condition Ith that determines whether the power converter 10 is operating in the continuous conduction mode Cmode or the discontinuous conduction mode Dmode. The continuous conduction mode Cmode is designed for the choke current IL to be continuously flowing through the coil L12. In the discontinuous conduction mode Dmode, the choke current IL is designed not to be continuously flowing through the coil L12. The present disclosure is not limited thereto.

Specifically, the continuous conduction mode Cmode can be designed such that another current, referred to as an inductor current, flowing through an inductor, except for the coil L12, contained in the power converter is continuously flowing through the inductor, and the discontinuous conduction mode Dmode can be designed such that the inductor current is discontinuously, i.e. interruptedly, flowing through the inductor. As the inductor current, the load current Iout, a current flowing through the load Z if the load Z is an inductive load, the primary current flowing through the primary winding L1, a secondary current flowing through the secondary winding L2, and so on can be used. That is, the dead-time control unit 19d, 19e is configured to initially determine or update the boundary condition Ith for determining whether:

the power converter is operating in the continuous conduction mode Cmode designed for an inductor current to be continuously flowing through the inductor; or the power converter is operating in the discontinuous conduction mode in which the inductor current is designed not to be continuously flowing through the inductor.

In this modification, it is possible to initially determine or update the boundary condition Ith that determines whether the power converter 10 is operating in the continuous conduction mode Cmode or the discontinuous conduction mode Dmode. Thus, it is possible to achieve the same effects as those achieved by a corresponding one of the first to seventh embodiments.

In each of the first to seventh embodiments, the dead-time control unit 19d, 19e uses, as the second measured value of the second electrical parameter, the measured voltage value Vd2 of the output voltage Vout from the switch circuit 11A, 11B, but the present disclosure is not limited thereto. Specifically, the dead-time control unit 19d, 19e can use, as the second measured value of the second electrical parameter, a measured value of the load current Tout output from the switch circuit 11A, 11B. In this modification, the output measuring unit 1A can be configured to measure a value of the load current Tout. Because the load current Tout depends on output power from the switch circuit 11A, 11B like the output voltage Vout, this modification can achieve the same effects as those achieved by a corresponding one of the first to seventh embodiments.

In each of the first to seventh embodiments, the slope signal generator 18 can be eliminated. In this modification, the signal processor 17 can be eliminated, so that the measured value Id of the input current can be input to the signal comparator 16. Then, the signal comparator 16 can compare the measured input-current value Id with the command current value Idir sent from the feedback unit 19 as a reference value, thus calculating the current deviation ΔI between the measured input-current value Id and the command current value Idir.

In each of the first to seventh embodiments, the power converter can use at least two of the first measuring unit 13a illustrated in FIG. 1, the first measuring unit 13c illustrated in FIG. 8, and the first measuring unit 13d illustrated in FIG. 10 as means for measuring the first measured value of the first electrical parameter depending on input power to the switch circuit 11A, 11B. In this modification, it is assumed that the first measuring units 13a, 13c, and 13d are used. In this case, the signal processor 17 or another selector can be configured to select one of a measured current value of the first measuring unit 13a, a measured current value of the first measuring unit 13c, and that of the first measuring unit 13d.

Specifically, the signal processor 17 or another selector can be configured to select one of the measured current value of the first measuring unit 13a, the measured current value of the first measuring unit 13c, and that of the first measuring unit 13d such that the selected measured current value is the highest or the lowest in all the measured current values. The signal processor 17 or another selector can be configured to select a peak in the measured current values of the first measuring unit 13a, the measured current values of the first measuring unit 13c, and those of the first measuring unit 13d each time a switching element is turned on. In addition, the signal processor 17 or another selector can be configured to select one of the measured current value of the first measuring unit 13a, the measured current value of the first measuring unit 13c, and that of the first measuring unit 13d each time a switching element is turned on.

In addition, the signal processor 17 or another processor can be configured to calculate an average value or a weighted average value of the measured current value of the first measuring unit 13a, the measured current value of the first measuring unit 13c, and that of the first measuring unit 13d. The signal processor 17 or another processor can be configured to calculate a higher value or a lower value based on the measured current value of the first measuring unit 13a, the measured current value of the first measuring unit 13c, and that of the first measuring unit 13d.

In each of the first to seventh embodiments, the power converter is designed as a DC-DC converter or an inverter. However, power converters according to the present disclosure can be designed as other power converters each equipped with upper- and lower-arm switching elements connected in series, and an inductive element, such as a transformer or a rotary machine including an inductive core. Each of the other power converters can determine a value of the dead time DT as a function of the variable boundary condition Ith that defines the boundary at which an operating mode thereof is changed between the continuous conduction mode Cmode and the discontinuous conduction mode Dmode (see FIG. 1). This determines a value of the dead time DT to be suitable for the continuous conduction mode Cmode or for the discontinuous conduction mode Dmode based on the variable boundary condition Ith even if the power converter 10 has a wide variable input-power range and a wide variable output-power range. This maintains at a high level, the power conversion efficiency η of each of the other power converters over its total operating range including a low-load operation range.

In each of the first, and third to sixth embodiments, the power converter is equipped with the transformer Tr as an inductive element. In addition, in each of the second and seventh embodiments, the power converter is designed to convert input DC power into output AC power, and supply the converted AC power to the rotary machine 20 as an inductive element. However, the present disclosure is not limited to the configurations. Specifically, in each of the first, and third to sixth embodiments, the power converter is equipped with at least one coil as an inductive element. As the transformer Tb, a transformer with no center taps can be used. In each of the second and seventh embodiments, the power converter can be designed to convert input DC power into output AC power, and output the converted AC power to an electric device including at least one coil as an inductive element. In each of these modifications, the power converter can determine a value of the dead time DT to be suitable for the continuous conduction mode Cmode or for the discontinuous conduction mode Dmode based on the variable boundary condition Ith even if the power converter has a wide variable input-power range and a wide variable output-power range. This maintains at a high level, the power conversion efficiency η of the power converter over its total operating range including a low-load operation range.

The disclosures according to the respective first to seventh embodiments and their modifications can be combined with each other. For example, the disclosure in the first embodiment and that in the fourth embodiment can be combined with each other. In place of or in addition to the dead-time control unit 19d according to the second embodiment, the dead-time control unit 19e according to one of the fourth to seventh embodiments can be used.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter for outputting converted power to a load, the power converter comprising:
   a driver that alternately turns on upper- and lower-arm switching elements of a switch circuit with a dead time between on states of the upper- and lower-arm switching elements using a manipulated variable for the upper- and lower-arm switching elements to convert input power to the switch circuit into output power of the switch circuit, the upper- and lower-arm switching elements being connected in series to each other;
   a feedback controller that feedback controls the manipulated variable based on a first electrical parameter depending on the input power and a feedback controlled variable determined for the output power; and
   a dead-time determiner that determines a value of the dead time as a function of a boundary condition that varies depending on at least one of an input voltage based on the input power and an output voltage based on the output power, the switch circuit converting the input voltage to the output voltage,
   the boundary condition representing a reference for determining whether the power converter is operating in a continuous conduction mode or a discontinuous conduction mode,
   the continuous conduction mode being designed for a current to be continuously flowing through an inductor included in at least one of the power converter and the load as an inductor current,
   the discontinuous conduction mode being designed for the inductor current to be discontinuously flowing through the inductor,
   wherein the dead-time determiner is configured to:
      determine the boundary condition that varies depending on a value of the input voltage and a value of the output voltage; and
      determine the value of the dead time according to the boundary condition, the input voltage, the output voltage, and a feedback controlled current as the feedback controlled variable, the feedback controlled current being calculated based on the input voltage and the output voltage.

2. The power converter according to claim 1, wherein the dead-time determiner is configured to determine the value of the dead time based on whether the feedback controlled current meets the boundary condition.

3. The power converter according to claim 1, wherein the boundary condition includes a physical quantity for the feedback controlled current, and the dead-time determiner is configured to determine the value of the dead time based on whether the feedback controlled current meets the boundary condition.

4. The power converter according to claim 1, wherein the power converter stores therein information showing correlation between a variable indicative of the boundary condition and a variable of the input voltage, and correlation between the variable indicative of the boundary condition and a variable of the output voltage, and the dead-time determiner is configured to determine the boundary condition based on the information, a present value of the input voltage, and a present value of the output voltage.

5. The power converter according to claim 1, wherein the boundary condition is a boundary range having a hysteresis width defined from a minimum boundary value to a maximum boundary value inclusive, the minimum and maximum boundary values representing maximum and minimum current values for the feedback controlled current, and the dead-time determiner is configured to determine the value of the dead time based on whether a value of the feedback current is equal to or lower than the minimum boundary value, and whether the value of the feedback current is equal to or higher than the maximum boundary value.

6. The power converter according to claim 5, wherein the boundary condition is a boundary region containing the boundary range, the boundary region being defined from a lower limit to a higher limit inclusive, the lower and higher limits representing higher and lower limits for the feedback controlled current, and the dead-time determiner is configured to determine the value of the dead time based on whether a value of the feedback current is equal to or lower than the lower limit, and whether the value of the feedback current is equal to or higher than the higher limit.

7. The power converter according to claim 1, wherein the dead-time determiner is configured to obtain a power conversion efficiency of the power converter based on a value of the input voltage and a value of the output voltage, and to determine the boundary condition based on the power conversion efficiency.

8. The power converter according to claim 1, wherein:
the switch circuit comprises a transformer comprised of a primary winding and a secondary winding magnetically coupled thereto.

9. The power converter according to claim 8, wherein the primary winding has a first end and a second end opposite thereto, the power converter further comprising:
a measuring module that measures the input voltage supplied to the primary winding, the measuring module being located within a predetermined range from one of the first and second ends of the primary winding.

10. A power converter for outputting converted power to a load, the power converter comprising:
a driver that alternately turns on upper- and lower-arm switching elements of a switch circuit with a dead time between on states of the upper- and lower-arm switching elements using a manipulated variable for the upper- and lower-arm switching elements to convert input power to the switch circuit into output power of the switch circuit, the upper- and lower-arm switching elements being connected in series to each other;
a feedback controller that feedback controls the manipulated variable based on a first electrical parameter depending on the input power and a feedback controlled variable determined for the output power; and
a dead-time determiner that:
obtains a value of a control parameter correlating with a power conversion efficiency of the power converter based on at least one of an input voltage as the first electrical input power and an output voltage based on the output power, the switch circuit converting the input voltage to the output voltage; and
determines a value of the dead time, according to the input voltage, the output voltage, and a feedback controlled current as the feedback controlled variable, the feedback controlled current being calculated based on the input voltage and the output voltage, such that the obtained value of the control parameter corresponding to the determined value of the dead time is maximized while the power converter is operating in a discontinuous conduction mode, the discontinuous conduction mode being designed for a current to be discontinuously flowing, as an inductor current, through an inductor included in at least one of the power converter and the load.

11. The power converter according to claim 10, wherein the dead-time determiner comprises:
a mode determiner that determines whether the power converter is operating in the discontinuous mode as a function of a boundary condition, the boundary condition representing a reference for determining whether the power converter is operating in a continuous conduction mode or the discontinuous conduction mode, the continuous conduction mode being designed for the inductor current to be continuously flowing through the inductor; and
an optimum dead-time determiner that determines the value of the dead time such that the obtained value of the control parameter corresponding to the determined value of the dead time is maximized upon determination that the power converter is operating in the discontinuous mode.

12. The power converter according to claim 10, wherein the driver cyclically performs alternative turn-on of the upper- and lower-arm switching elements using a value of the manipulated controlled variable cyclically feedback controlled by the feedback controller while the dead-time determiner cyclically varies the value of the dead time in a descending direction of the dead time; and
the dead-time controller is configured to:
cyclically obtain the value of the control parameter based on at least one of the value of the input voltage and the value of the output voltage while the dead-time determiner cyclically varies the value of the dead time in the descending direction of the dead time; and
determine one of the varied values of the dead time such that one of the obtained values of the control parameter corresponding to the one of the varied value of the dead time is maximized while the power converter is operating in the discontinuous conduction mode.

13. The power converter according to claim 10, wherein:
the driver cyclically performs alternative turn-on of the upper- and lower-arm switching elements using a value of the manipulated controlled variable cyclically feedback controlled by the feedback controller while the dead-time determiner cyclically varies the value of the dead time; and
the dead-time determiner comprises:
a peak detector that cyclically measures a peak of an input current as the value of the control parameter,
the dead-time determiner being configured to determine one of the varied values of the dead time such that one of the measured peaks of the input current corresponding to the one of the varied value of the dead time is maximized while the power converter is operating in the discontinuous conduction mode.

14. The power converter according to claim 13, wherein the peak detector is configured to cyclically measure a value of the input current to the switch circuit, and comprises a filter circuit that passes at least frequency components contained in the measured values of the input current, the at least frequency components being within a target frequency range corresponding to surge components contained in the measured values of the input current.

15. The power converter according to claim 10, wherein:
the driver cyclically performs alternative turn-on of the upper- and lower-arm switching elements using a value of the manipulated controlled variable cyclically feedback controlled by the feedback controller while the dead-time determiner cyclically varies the value of the dead time; and
the dead-time controller is configured to:
cyclically obtain the value of the control parameter based on at least one of the value of the input voltage and the value of the output voltage while the dead-time determiner cyclically varies the value of the dead time; and
determine one of the varied values of the dead time such that one of the obtained values of the control parameter corresponding to the one of the varied value of the dead time is maximized while the power converter is operating in the discontinuous conduction mode.

16. The power converter according to claim 15, wherein:
the switch circuit comprises a transformer comprised of a primary winding and a secondary winding magnetically coupled thereto.

17. The power converter according to claim 16, wherein the primary winding has a first end and a second end opposite thereto, the power converter further comprising:
a measuring module that measures the input voltage supplied to the primary winding, the measuring module being located within a predetermined range from one of the first and second ends of the primary winding.

* * * * *